United States Patent
Wakamatsu et al.

(10) Patent No.: US 6,892,475 B2
(45) Date of Patent: May 17, 2005

(54) DEVICE FOR TREATING POWDER PARTICLES BY ROTARY FLOW

(75) Inventors: Yoshihiro Wakamatsu, Tokyo (JP); Satoru Watano, Osaka (JP)

(73) Assignee: Nara Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/483,581

(22) PCT Filed: Oct. 25, 2002

(86) PCT No.: PCT/JP02/11071

§ 371 (c)(1),
(2), (4) Date: Jan. 8, 2004

(87) PCT Pub. No.: WO03/037500

PCT Pub. Date: May 8, 2003

(65) Prior Publication Data

US 2004/0168342 A1 Sep. 2, 2004

(30) Foreign Application Priority Data

Oct. 29, 2001 (JP) ........................................ 2001-331023
Jul. 10, 2002 (JP) ........................................ 2002-200690

(51) Int. Cl.$^7$ .............................................. F26B 17/00
(52) U.S. Cl. .............................. 34/576; 34/582; 34/586; 34/593; 34/368; 422/139; 422/186; 422/186.3
(58) Field of Search .......................... 34/576, 582, 586, 34/593, 368; 432/58; 422/139, 186, 186.3

(56) References Cited

U.S. PATENT DOCUMENTS 3,849,900 A * 11/1974 Dale et al. .................... 34/368

5,374,405 A * 12/1994 Firnberg et al. .......... 422/186.3

FOREIGN PATENT DOCUMENTS

| JP | 07-108157 | 4/1995 |
| JP | 07-171322 | 7/1995 |
| JP | 2002-119843 | 4/2002 |
| JP | 2002-143705 | 5/2002 |

* cited by examiner

Primary Examiner—Jiping Lu
(74) Attorney, Agent, or Firm—Ladas & Parry LLP

(57) ABSTRACT

The present invention relates to a rotating fluidized bed apparatus for powder particle. A gas circulation path is formed at the periphery of the treatment chamber 2 via the circumferential faceplate 202, 212, and the circumferential faceplate is adapted to rotate around an axis. Behavior of powder particles can be controlled by introducing gas from the periphery of the treatment chamber via the circumferential plate 212 to exert centripetal force on the powder particle, while exerting centrifugal force on the powder particles accompanying rotation of the circumferential plate 212. In another aspect, by making the arrangement proportion of the bag filter 5 inside the treatment chamber 2 wider than the surface width of the dispersion plate 212 or larger than the surface area of the dispersion plate 212, it is possible to cause gas that has flowed into the treatment chamber 2 to be discharged at a lower rate at an axial region inside the treatment chamber 2 where centrifugal force is weak and discharge rate is fast. It is possible to carry out optimal operation control of introduction and discharge of gas for fluidized bed behavior.

28 Claims, 19 Drawing Sheets

F I G. 7
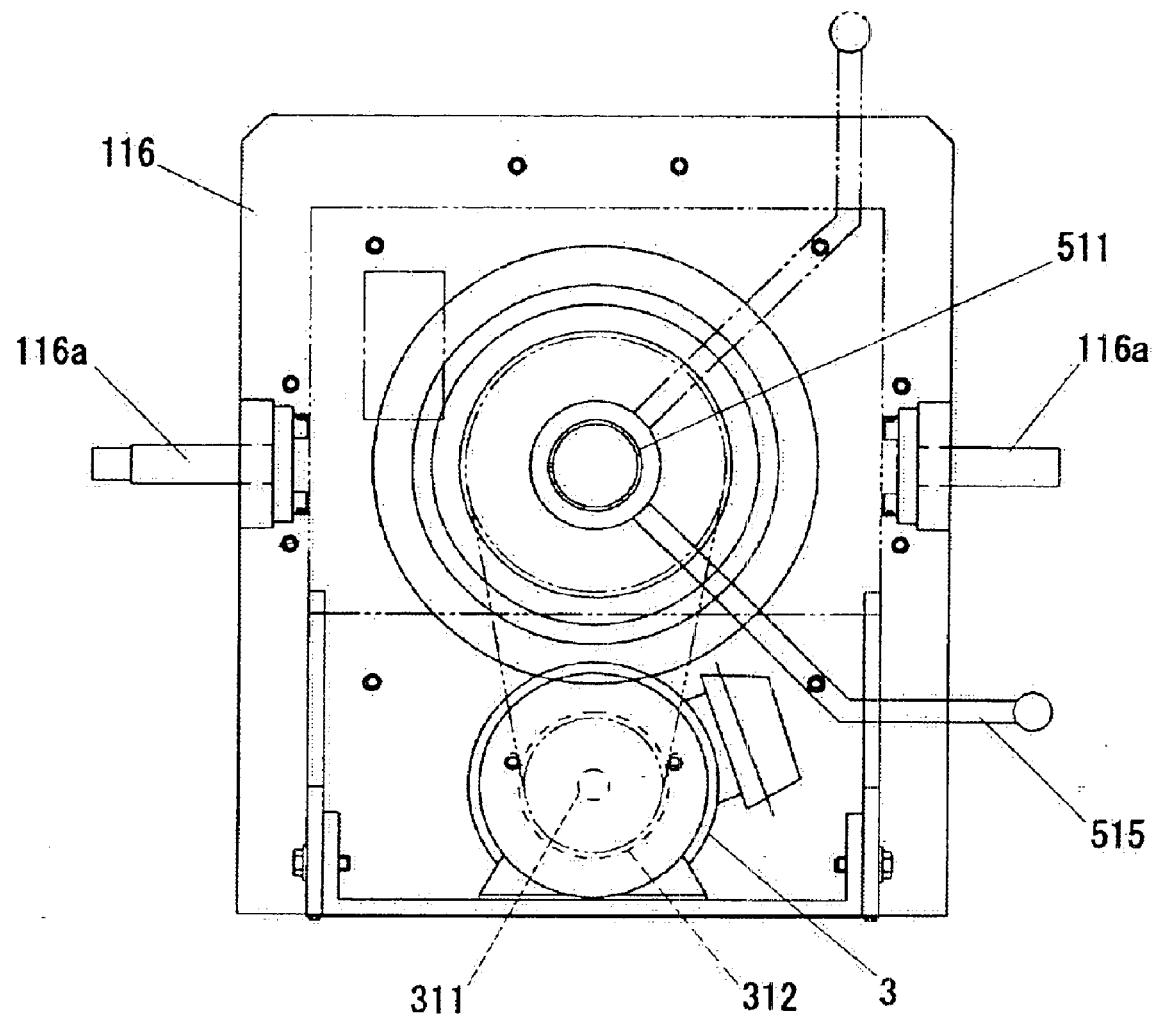

F I G. 8
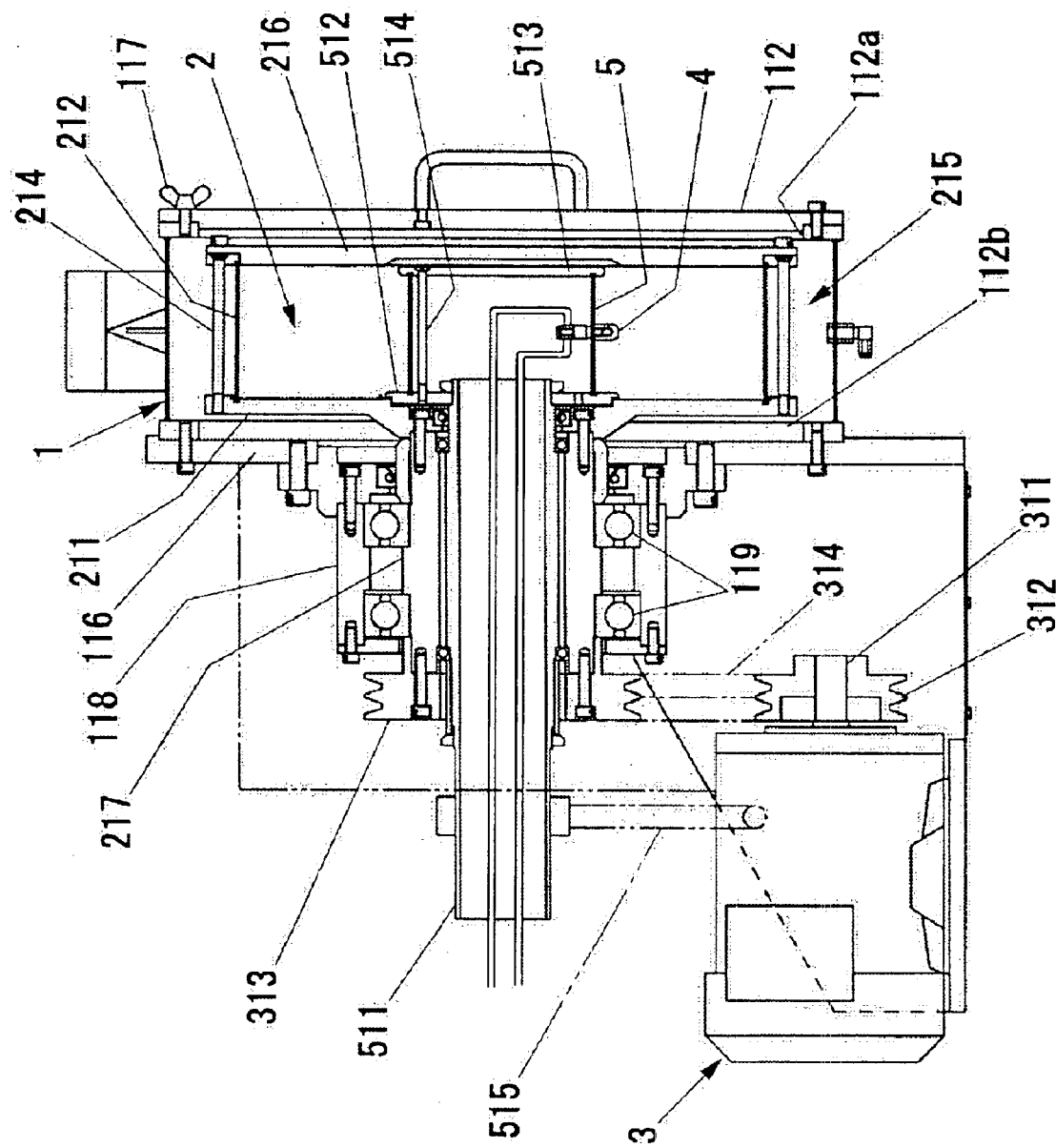

(A)          (B)

heated air ial region inside the treatment chamber where discharge velocity is high with weak centrifugal force. By doing this, it is possible to efficiently discharge gas that has been introduced into the treatment chamber while balancing centripetal force and centrifugal force on the powder particles regardless of the particle size, and it is possible to carry out optimal operation control of introduction and discharge of gas for fluidized bed behavior. It is also possible to anticipate improved product collection rate by reducing the amount of powder particles sticking to a bag filter accompanying gas flow, and reducing the amount of discharge through the bag filter.

DEVICE FOR TREATING POWDER PARTICLES BY ROTARY FLOW

TECHNICAL FIELD

The present invention is in the field of fluidized bed apparatus for treating powder particles by mixing, granulating, coating, surface treatment, drying, reaction etc., and particularly relates to a fluidized bed apparatus suitable for treating fine powder particles.

BACKGROUND ART

Generally, a fluidized-bed apparatus, as shown in FIG. 20, is known as a device for allowing mixing, granulation, coating, drying or reaction of powder particles by causing a gaseous body such as various gases or air to flow in to the inside of a treatment chamber.

This fluidized-bed apparatus is formed of a truncated cone-shaped container 2A having a dispersion plate 3A (for example, a punched porous plate) for ventilation arranged at the bottom. When this apparatus is used to dry powder particles, heated air is made to flow in to the container 2A from below the dispersion plate 3A, and powder particles 1A put inside the container 2A are dried while being subjected to suspension fluidization.

On the other hand, when using this apparatus for granulation processing, a specified binder fluid (liquid) for granulation (for example, a solution such as carboxymethylcellulose, polyvinyl alcohol, or hydroxypropyl cellulose) is sprayed from a nozzle 4A to powder particles being fluidized to granulate by forming solid bridges between particles by allowing drying of the powder particles at the same time as wet curing.

Recently, in fields such as medical supplies, agricultural chemicals, fertilizers, foodstuff, ceramics etc., there has been a demand to increase the functionality possessed by particles, and to endow particles with new functions in order to manufacture high quality products. There has therefore also been a demand, in the granulation process, for processing of fine powder particles of raw material in the micron and sub-micron order. Specifically, if granulated products of about 50 µm are to be produced, it is necessary to handle fine powder particles of 10–30 µm and also single order micron fine particles as the raw material.

However, since cohesiveness and adhesiveness increase rapidly as particle diameter of the processing material becomes smaller, it is not possible to uniformly fluidize and disperse the powder particles with the previously described existing fluidized bed apparatus. On the other hand, there is a problem that if the amount of heated air supplied is increased in order to achieve uniform fluidization and dispersion, the body of fine powder particles will fly out as it is, handling is extremely difficult, and it is not possible to carry out control to form a satisfactory fluidized bed. Therefore, with the fluidized bed apparatus of the related art, there is a limit to effective fluidized bed control due to the structure of the apparatus itself.

The object of the present invention is to completely solve the above described problems, and to form a fluidized bed controlling behavior of powder particles by introducing gas from outside the treatment chamber via a circumferential faceplate to provide centripetal force to powder particles inside the treatment chamber, and providing centrifugal force on the powder particles in accordance with rotation of the circumferential faceplate. By doing this, it is possible to provide a fluidized bed apparatus for a body of powder particles that can perform various types of processing such as mixing, granulation, coating, drying and reaction even for fine powder particles in the micron or sub-micron range.

In actually realizing such a fluidized bed apparatus, there are various problems to be solved in implementation of the overall structure of the apparatus with taking manufacturability and maneuverability into consideration, such as the specific arrangement and interrelation of various equipment, such as a gas supply device, operation control device, motor, granulation nozzle, operating panel, gas supply piping, wiring etc. as well as maintaining optimization of influx and discharge of gas attributable to size of the treatment chamber and blockage of a bag filter etc.

Another object of the present invention is to solve the problems facing actual making of products described above, and to cause slowing of discharge velocity of gas that has been introduced inside the treatment chamber at an axial region inside the treatment chamber where discharge velocity is high with weak centrifugal force. By doing this, it is possible to efficiently discharge gas that has been introduced into the treatment chamber while balancing centripetal force and centrifugal force on the powder particles regardless of the particle size, and it is possible to carry out optimal operation control of introduction and discharge of gas for fluidized bed behavior. It is also possible to anticipate improved product collection rate by reducing the amount of powder particles sticking to a bag filter accompanying gas flow, and reducing the amount of discharge through the bag filter.

A further object of the present invention to cause gas to flow in to the inside of the treatment chamber in a uniform manner from the entire surface region of gas ventilation means and not excessively circulating gas supplied to gas introduction means, as well as reducing the diameter of a gas supply port, and to enable manufacture of a supply structure without causing a gas supply path to project to the outer surface of a casing. As a result of doing this, arrangement of gas introduction means and a casing and arrangement of the gas introduction means and a treatment chamber, and interrelation between gas introduction means and a gas supply device is optimized, a supply structure for gas in the apparatus overall is simplified, and manufacture of the apparatus becomes simple.

DISCLOSURE OF THE INVENTION

Technical means adopted by the present invention in order to solve the above described problems is a rotating fluidized bed apparatus for powder particle for causing gas to flow in to a cylindrical treatment chamber in which powder particles are placed, via a circumferential faceplate having permeability, and discharging gas that has flowed into the treatment chamber from the treatment chamber via a bag filter, wherein a gas circulation path is formed at the periphery of the treatment chamber via the circumferential faceplate, and the circumferential faceplate is adapted to rotate around an axis.

Another technical means adopted by the present invention is a rotating fluidized bed apparatus for powder particle comprising, inside a casing, a rotatable treatment chamber having an axis and being provided with cylindrical gas ventilation means having permeability at its circumference about the axis, gas introduction means provided at the periphery of the treatment chamber for causing gas to flow into the treatment chamber via the gas ventilation means, and a bag filter, provided inside the treatment chamber, for discharging gas that has been introduced into the treatment chamber to the outside, wherein an arrangement proportion of the bag filter inside the treatment chamber is wider than a surface width of the gas ventilation means, or larger than the surface area of the gas ventilation means.

A still further technical means adopted by the present invention is a rotating fluidized bed apparatus for powder particle comprising, inside a casing, a rotatable treatment chamber having an axis and being provided with cylindrical gas ventilation means having permeability at its circumference about the axis, gas introduction means provided at the periphery of the treatment chamber for causing gas to flow into the treatment chamber via the gas ventilation means, and a bag filter, provided inside the treatment chamber, for discharging gas that has been introduced into the treatment chamber to the outside, wherein the gas introduction means is comprised of a gas introduction passage formed between the casing and the ventilation means, and a plurality of supply ports provided at specified intervals on an inner wall forming the gas introduction passage.

BRIEF DESCRIPTION OF THE DRAWINGS

FIG. 7 is a rear view showing a casing body;

FIG. 8 is a side cross-sectional view showing a casing body;

BEST MODE FOR CARRYING OUT THE INVENTION

The present invention will now be described in detail based on a rotating fluidized bed apparatus for powder particle as a preferred embodiment.

Figure 1:
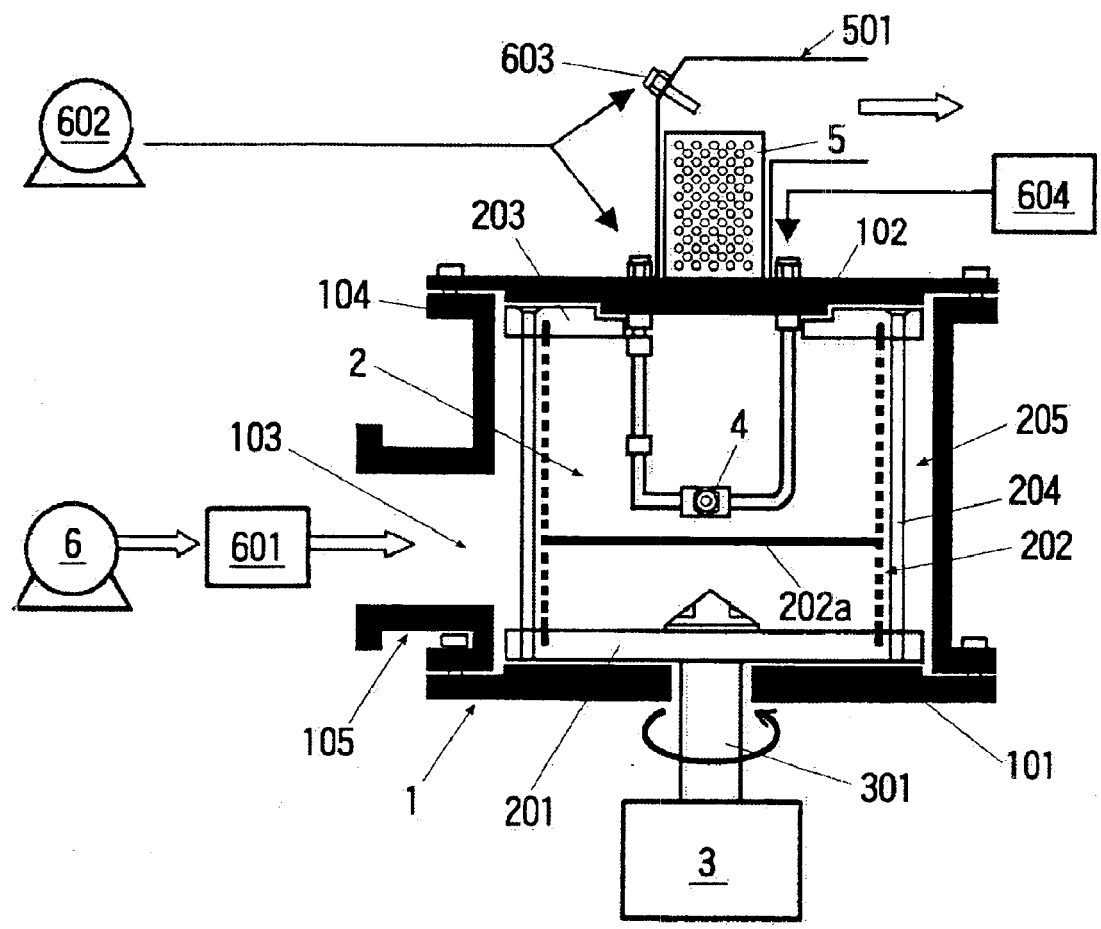
FIG. 1 is an overall structural diagram of a vertical fluidized bed apparatus of a first embodiment.

A first embodiment of this apparatus having a vertical structure will be described based on FIG. 1 and FIG. 11 that is also used with the second embodiment. Reference numeral 1 is a cylindrical casing, and inside this casing 1 a cylindrical treatment chamber 2 for treating a powder particle material is arranged with a specified space from an inner wall surface of the casing 1.

In the treatment chamber 2, a lower fixed plate 201 is rotatably linked via a rotation shaft 301 to a drive unit 3. A circumferential faceplate 202 provided on an outer peripheral surface region of the cylindrical treatment chamber 2 is comprised of specified ventilation means for causing specified gas such as various gases or air to be introduced into the treatment chamber 2 in a manner enabling ventilation from a dispersion plate. The circumferential faceplate 202 is attached between the lower fixed plate 201 and an upper fixed plate 203 in a state of being sandwiched by these two plates, using bolts 204, and can be attached and detached by tightening or loosening the bolts 204. The dispersion plate can be suitably exchanged for a porous plate, slit, metal mesh, multilayer mesh, or metal fiber etc. having different diameter holes depending on physical properties, such as the particle diameter of the processed powder material.

Figure 9:
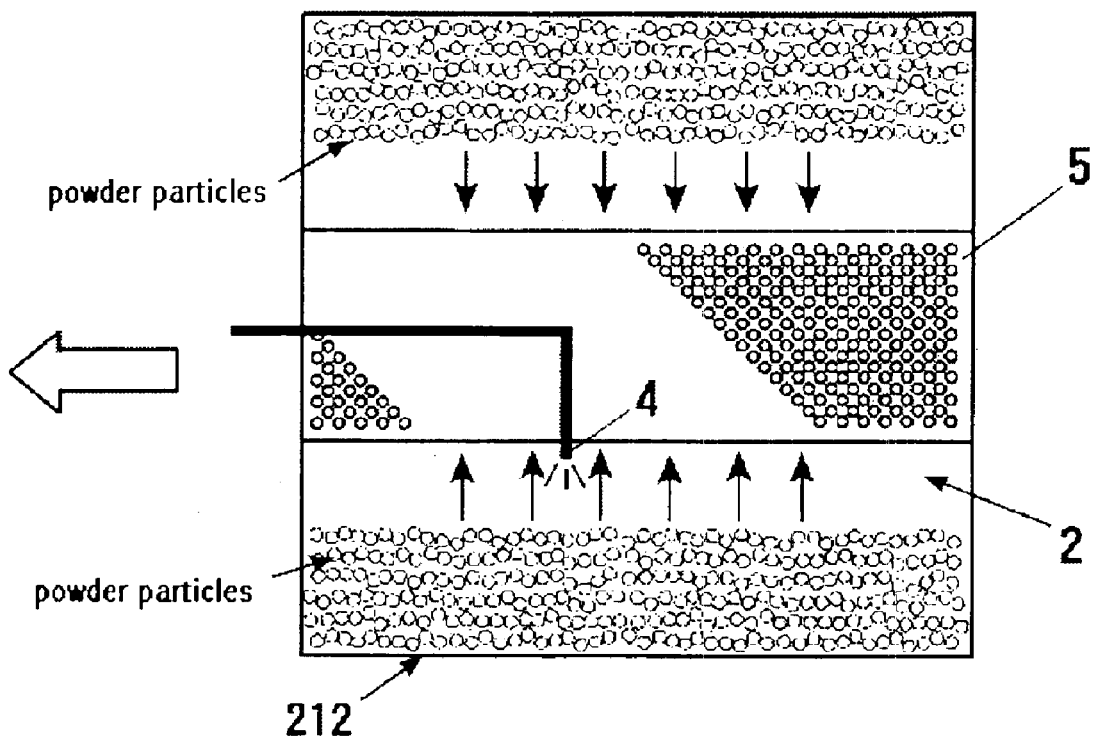
FIG. 9 is an essential cross sectional view of a treatment chamber.

A granulation nozzle 4 for spraying a supplied binder fluid for granulation is provided inside the treatment chamber 2. Respective piping for supplying granulation binding fluid and compressed air to the granulation nozzle 4 is provided on the upper fixed plate 203. A communicating port to a discharge pipe 501 housing a cylindrical bag filter 5 is also provided on the upper fixed plate 203 as discharge means for discharging gas that has been introduced into the treatment chamber 2. Also, in FIG. 1 the bag filter 5 is provided midway along the discharge pipe 501, but the bag filter 5 can also be provided inside the treatment chamber 2 as shown in FIG. 8 and FIG. 9.

In the case of a vertical apparatus, the powder particles are piled up in a lower portion due to gravity, and this tends to occur more with small particle diameter, causing bad fluidity. This means that even if the treatment chamber 2 is caused to rotate to apply centrifugal force to the powder particles inside the treatment chamber 2, there is a tendency for the layer thickness (a distance from the circumferential plate 202 in an axial direction) of a powder particle layer to increase towards the lower side. Reference numeral 202a is a bottom surface plate for variable adjustment of internal volume of the treatment chamber 2, namely, the height of the treatment chamber 2, and gas flow supplied from gas inflow means passes uniformly through the circumferential plate 202 to simply form an appropriate fluidized bed. An arbitrary plate such as a non-porous plate or porous plate (enabling inflow of specified gas from underneath) is adopted as the bottom surface plate 202a.

The casing 1 has a through hole through hole for a rotating shaft 301 in a bottom part, is formed from a container 101 having a supply port 103 for supplying a specified gas (various gases such as heated air, inert gas etc.) to a side section and a cover body 102 having a communication port connecting between pipe holes for various piping for supplying granulation binder fluid and compressed air to the granulation nozzle 4 and a discharge pipe 501, and the cover body 102 is fastened to a flange section 104 of the container 101 so as to be capable of being opened and closed using a bolt 104.

As the gas, heated air that has been produced by heating air conveyed from a blower 6 with a heater 601 is used, and this heated air is sent through the supply pipe 105 to the supply port 103. Also, compressed air that has been supplied from a compressor 602 and granulation binder fluid supplied from a binder supply device 604 are respectively fed to the granulation nozzle 4 so as to be finely sprayed to the inside of the treatment chamber 2. In order to generate finely granulated material, a so-called two-fluid or four-fluid fine spray nozzle is preferably used as the granulation nozzle 4.

A specified space formed between an inner wall surface of the casing 1 and an outer surface region of the circumferential plate 202 (ventilation means) of the treatment chamber 2 is formed as a circulation path 205 for heated air that has been supplied from the supply port 103.

Figure 11:
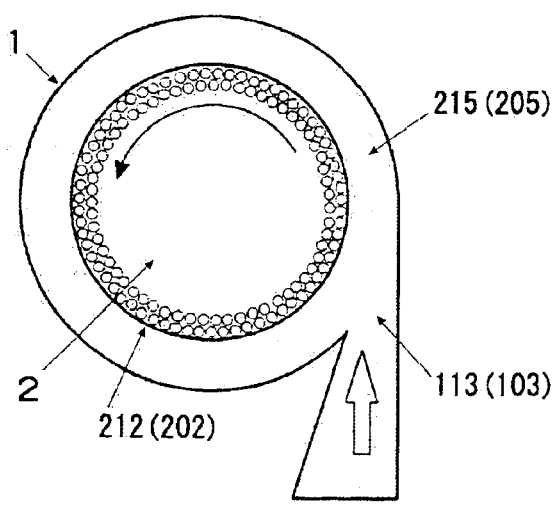
FIG. 11 is an essential cross-sectional view of a flow apparatus.

For supplying heated air to the circulation path 205, as shown in FIG. 11, the supply port 103 is arranged to supply heated air towards the rotation direction of the treatment chamber 2, while the supply pipe 105 is arranged at a side surface of the casing 1 from a substantially tangential direction to the same direction of rotation as the treatment chamber 2, so as to further stabilize the supply of heated air.

Gas inflow means for causing heated air to flow dispersedly into the inside of the treatment chamber 2 via the circumferential plate 202 is formed using the circulation path 205 and the supply port 103.

Heated air that has flowed into the treatment chamber 2 passes from a communication port opened in the cover body 102 though the bag filter 5 and is discharged to the outside via the discharge pipe 501.

A pulse jet nozzle 603 for spraying the compressed air from the compressor 602 is provided above the bag filter 5, and by spraying the compressed air intermittently in the direction of the bag filter 5, powder particles collected by the bag filter 5 are returned to the treatment chamber 2.

FIG. 2 to FIG. 9 show a second embodiment enabling construction of a horizontal apparatus. FIG. 11 is an explanatory diagram that is also used with the first embodiment. With this apparatus, the bag filter 5 is arranged at an axial section of the inside of the treatment chamber 2, and the bottom surface plate 202a is not provided inside the treatment chamber 2. The remaining structure and concept of the fluidized bed are the same as for the first embodiment.

Figure 2:
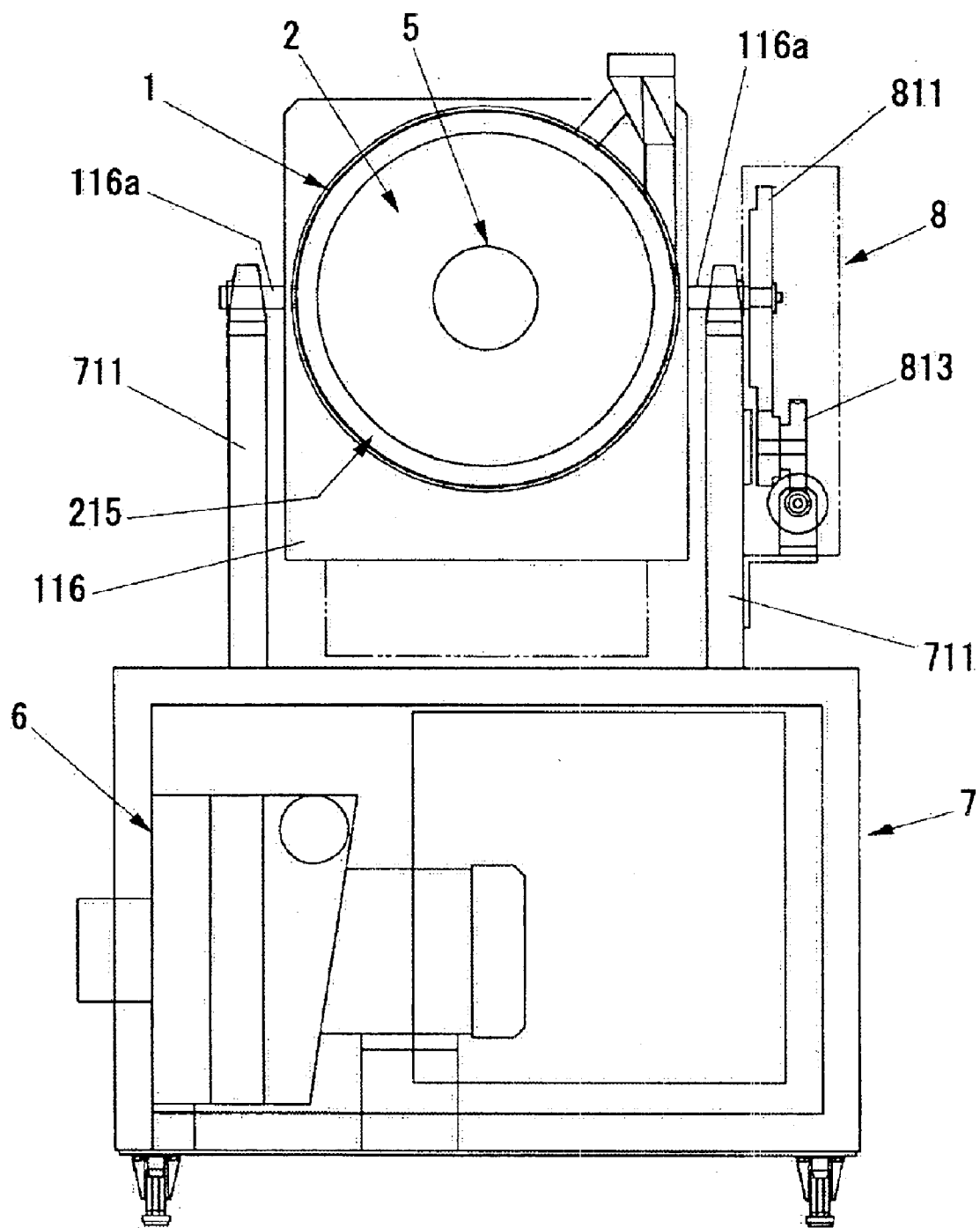
FIG. 2 is an overall front view of a horizontal fluidized bed apparatus of a second embodiment.
Figure 3:
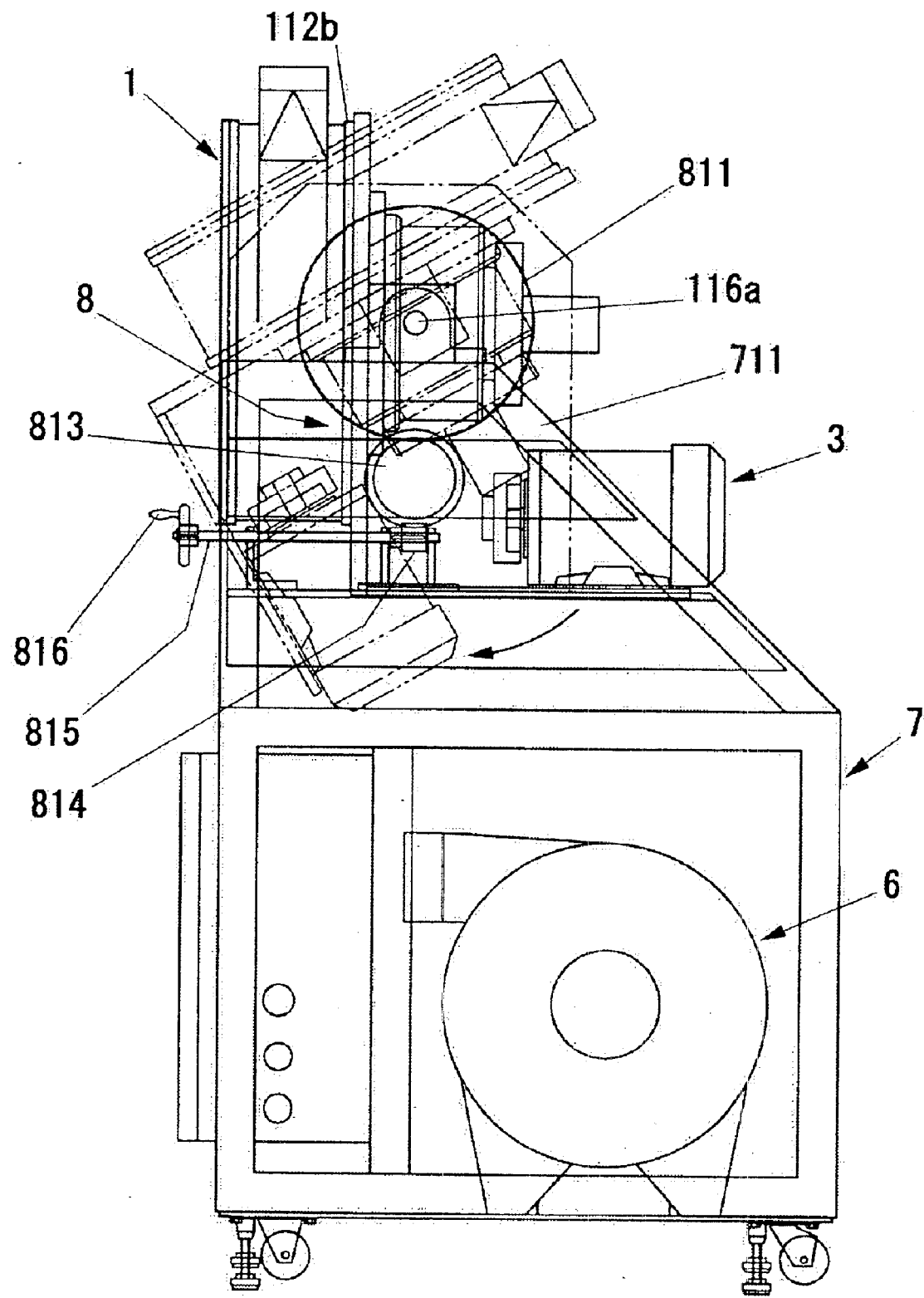
FIG. 3 is an overall side view of a horizontal fluidized bed apparatus.

FIG. 2 is an overall front view of the fluidized bed apparatus, and FIG. 3 is an overall side view of the fluidized bed apparatus. As shown in these drawings, the casing 1 is fixed to a body bracket 116 at a bottom part, and is attached to a frame 7 via this body bracket 116. A pair of left and right arm shaped support frames 711 are erected at specified intervals on this frame 7, while a pair of left and right support shafts 116a projecting outwards to the left and right are provided on the body bracket 116, and the support shafts 116a are rotatably supported in the support frames 711. In this way, the casing 1 is constructed capable of changing orientation of the rotating shaft of the treatment chamber 2 by rotating from horizontal to vertical, and can be used in either of a case where the treatment chamber 2 shown in FIG. 1 is a vertical type or is a horizontal type. In this apparatus, in the case of a vertical type apparatus, feeding in and taking out of the powder particles is carried out with the opening section 112a of the casing 1 facing upwards (rotation axis vertical), and granulation processing is carried out with the opening section 112a facing sideways (rotation axis horizontal).

Figure 4:
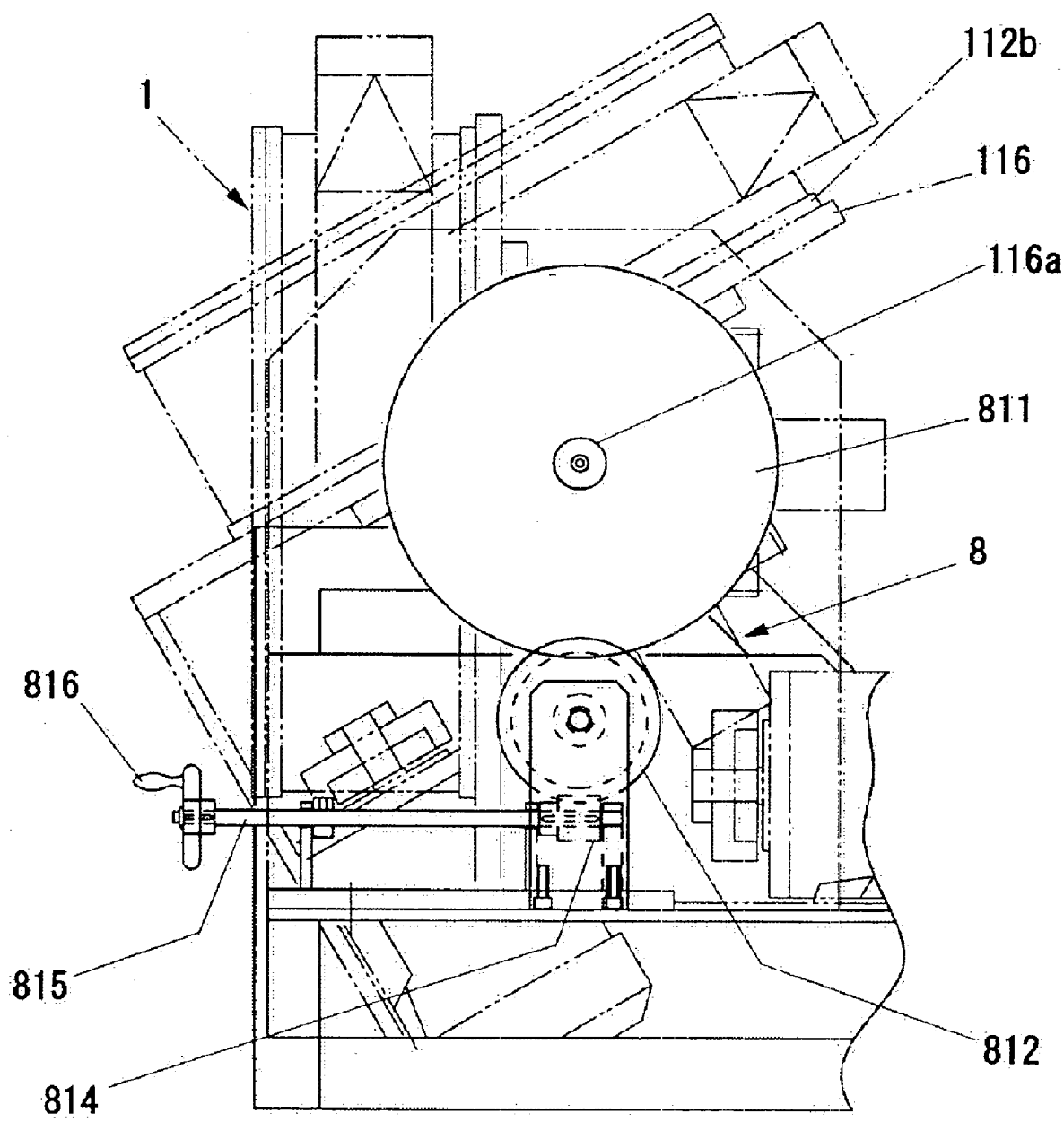
FIG. 4 is a side view showing a rotational operation mechanism of a casing body.
Figure 5:
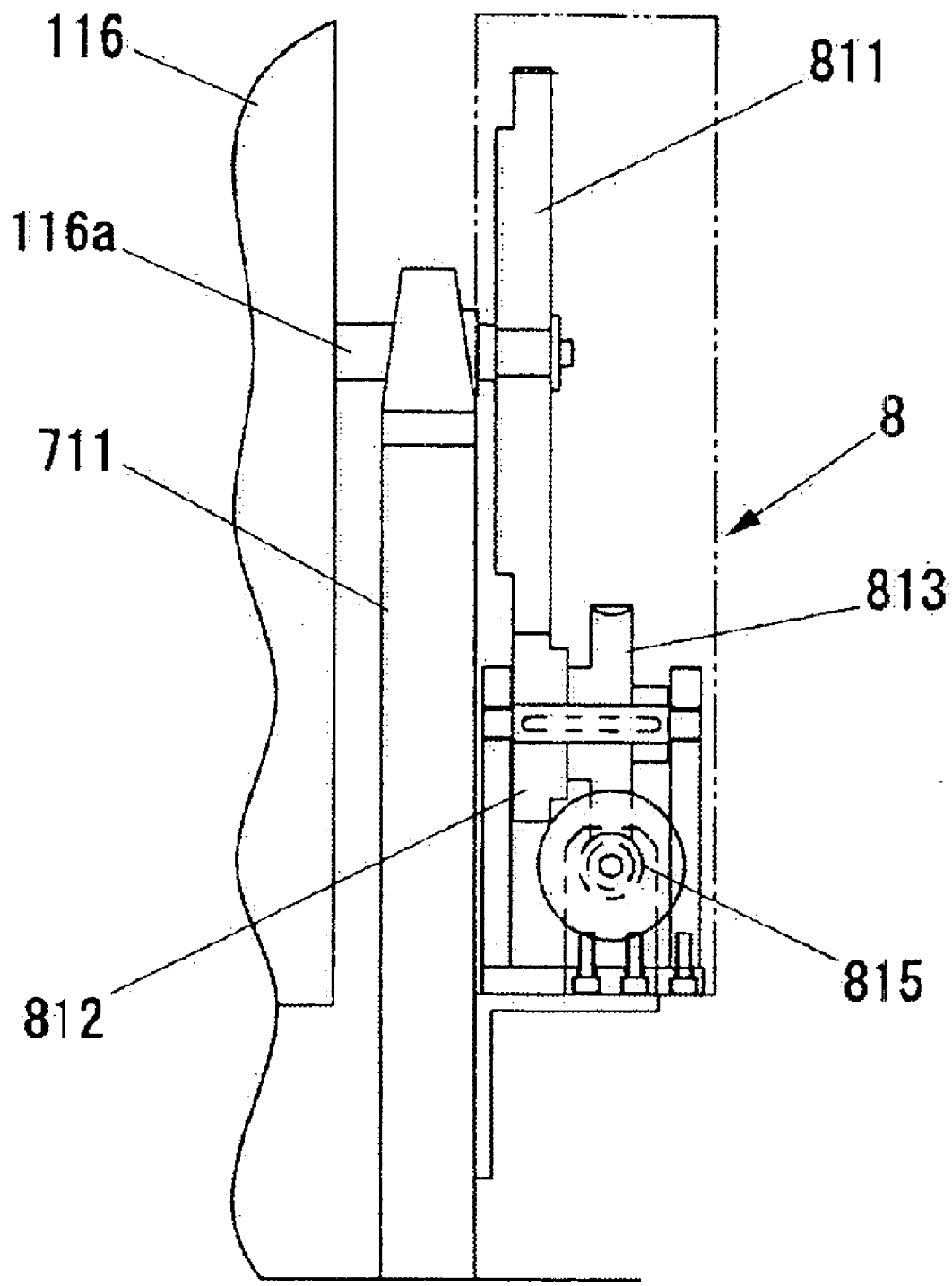
FIG. 5 is a drawing showing the essential details of the rotation operation mechanism.

FIG. 4 is a side view showing a rotation operation mechanism of a treatment apparatus body, and FIG. 5 is an essential detail drawing of the rotation operation mechanism. As shown in these drawings, a rotation operation mechanism 8 for rotation operation of the casing 1 is provided on an outer side of the right support frame 711 in FIG. 2. The rotation operation mechanism 8 is comprised of a large diameter gear 811 provided integrally with the right support shaft 116a, a small diameter gear 812 meshing with the large diameter gear 811, a worm wheel 813 rotating integrally with the small diameter gear 812, a worm 814 meshing with the worm wheel 813, and a handle shaft 815 for rotatably operating the worm 814. A handle 816 is provided on a front end of the handle shaft 815, and by turning the handle 816, that operation force is transmitted through the worm 814, worm wheel 813, small diameter gear 812 and large diameter gear 811 to the support shaft 116a, and the casing body 1 is turned. Since the worm 814 is then interposed in this transmission path, it is possible to reduce the handle operating force by ensuring a large reduction ratio, while at the same time having a structure enabling the casing body 1 to be fixed to an arbitrary position by a brake operation of the worm 814.

Figure 6:
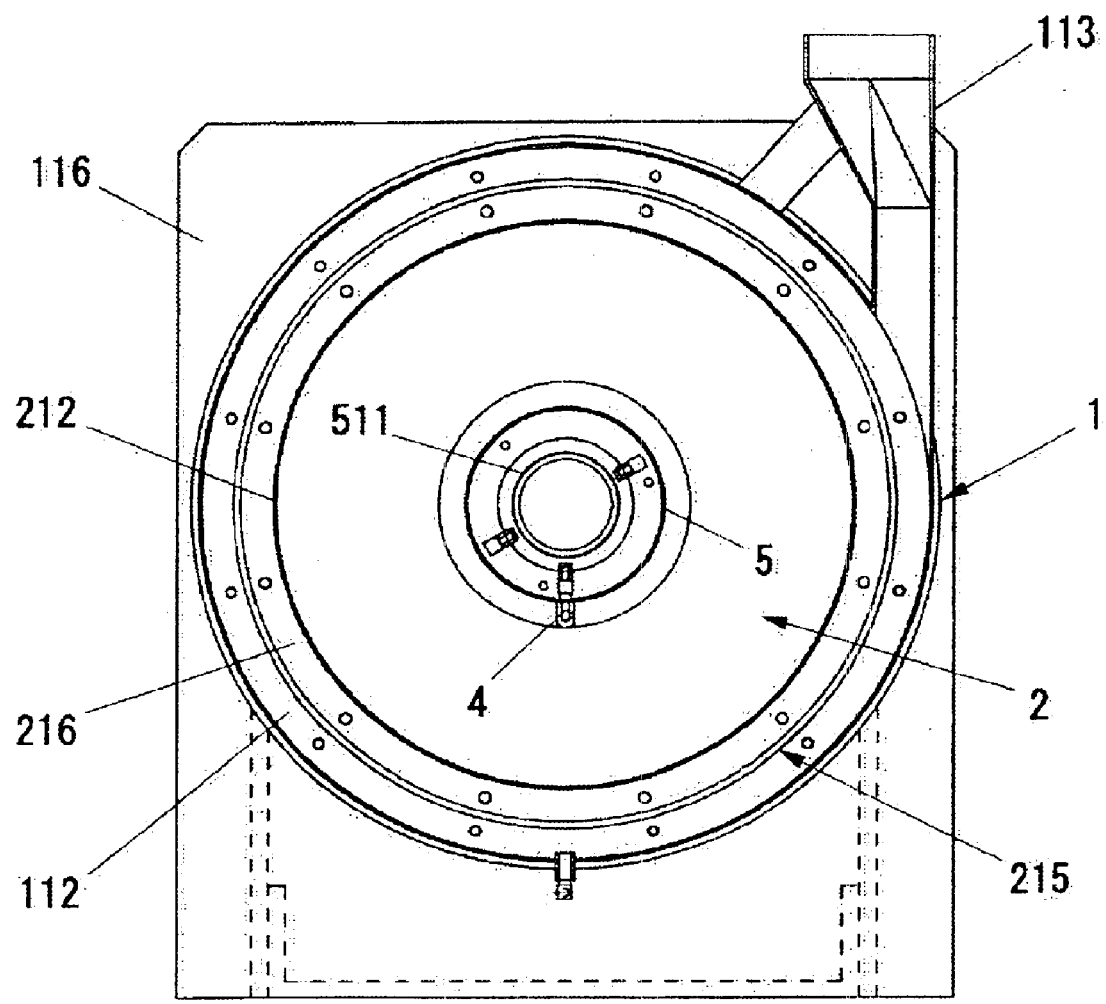
FIG. 6 is a front view showing a casing.

FIG. 6 is a front view showing a casing body 1 of a fluidized bed apparatus, FIG. 7 is a rear view showing the casing body 1, FIG. 8 is a side cross-sectional view showing the casing body 1 and FIG. 9 is an essential cross-sectional view of a treatment chamber. As shown in these drawings, the casing body 1 of the fluidized bed apparatus is a cylindrical shape having an opening section 112a at a front surface part, and the air circulation path 215, the treatment chamber 2 having a front section opened and the bag filter 5 arranged at an axial region inside the treatment chamber 2 are provided inside the casing body 1.

The air circulation path 215 is formed between an inner wall surface of the casing 1 and an outer surface region of the circumferential faceplate 212 (dispersion plate), as ventilation means for the treatment chamber 2. A rear surface part 112b of the casing 1 is integrally fixed to the body bracket 116, while an opening part 112a of the front surface part is covered by a disk-shaped cover body 112 formed from a transparent acrylic resin. The cover body 112 has an outer edge section fixed to the casing 1 using a plurality of butterfly bolts 117, and can be attached and detached by tightening or loosening the butterfly bolts 117.

Also, the supply port 113 for introducing a specified gas (various gasses such as heated air, inert gas etc.) into the air circulation path 215 is formed in a right upper part of the casing 1, and is adapted to cause gas that has been introduced from the supply port 113 to circulate along the inner surface of the casing 1, as shown in FIG. 11. For example, in the case of introducing heated air, air generated by a blower 6, as with the gas inflow means of the first embodiment shown in FIG. 1, is heated by the heater 601 and introduced to the supply port 113.

The treatment chamber 2 is formed so that a disk-shaped rear fixed plate 211 and a disk-shaped cover body 216 formed of transparent acrylic resin are opposite each other with a specified distance between them, with a circular dispersion plate 212 fitted between them. The fixed plate 211 and the cover body 216 are connected by a plurality of bolts 214, and attachment and detachment of the cover body 216 and the dispersion plate 212 is made possible by tightening or loosening the bolts 214. The dispersion plate 212 is arranged with a specified distance with respect to the inner wall of the casing 1, and has such a structure that gas introduced from the supply port 113 to the air circulation path 215 flows into the treatment chamber 2 through the dispersion plate 212. The dispersion plate 212 can be appropriately replaced with one having different hole diameters or material properties, depending on the particle diameter of the powder particles being processed, etc., and it is possible to use a porous plate, slits, metal mesh, multilayer metal mesh, metal fiber etc. For example, since a multilayer metal mesh is formed by superposing a plurality of metal meshes having different sized openings, and sintering them at a specified pressure and temperature, it is possible to prevent the mesh becoming clogged with powder particles by having a structure with metal meshes of fine openings on the surface contacting the powder particles.

A cylindrical rotation support shaft 217 extending to the rear is integrally connected to a central part of the rear fixed plate 211, and the rotation support shaft 217 is rotatably supported in an inner periphery portion of a cylindrical holder 118 provided on the body bracket 116 via a pair of bearings 119. A motor 3 (drive unit) is arranged beneath the rotation support shaft 217, with a pulley 312 integrally provided on a motor shaft 311 of the motor 3 and a pulley 313 integrally provided on the rotation support shaft 217 being connected through a transmission belt 314. In this way it becomes possible to rotate the treatment chamber 2 in response to drive of the motor 3 and supply centrifugal force to the powder particles inside.

The bag filter 5 is formed from cylindrical mesh plates and is fitted between a disk-shaped rear plate 512 having an opening at the center and a disk-shaped front plate 513 formed of transparent acrylic resin that are opposite each other with a specified distance between them. The rear plate 512 and the front plate 513 are connected using a plurality of bolts 514, and the front plate 513 and the bag filter 5 can be attached or removed by tightening or loosening the bolts 514. The bag filter 5 is arranged at a specified interval with respect to the dispersion plate 212, and is configured so that gas that has flowed into the treatment chamber 2 via the dispersion plate 212 is discharged through the bag filter 5. The bag filter 5 can be appropriately replaced with one having different hole diameter or material properties depending on particle diameter of the powder particles being processed, and as well as materials used for the dispersion plate 212 it is also possible for the bag filter to have a cylindrical structure using a retainer and bag shaped bag cloth (woven or non-woven fabric) made of various materials for covering the retainer.

A cylindrical discharge pipe 511 extending to the rear is integrally connected to a central opening section of the rear surface plate 512, configured so that gas that has been discharged from the treatment chamber 2 via the bag filter 5 is discharged to the outside of the apparatus (outside the system) via the discharge pipe 511. The discharge pipe 511 is rotatably supported in an inner part of the rotation support shaft 217, and also a rotation operation lever 515 is integrally provided on a rear end of the discharge pipe 511. The rotation operation lever 515 is for operation when the powder particles have accumulated on the bag filter 5, and it is permissible to rotate the bag filter through about 180°.

The granulation nozzle 4 is provided inside the bag filter 5, as shown in FIG. 9. The granulation nozzle 4 is connected to a binder supply device and a compressor (refer to FIG. 1) via piping, and a specified granulation binder supplied from the supply device is sprayed into the treatment chamber 2.

Figure 10:
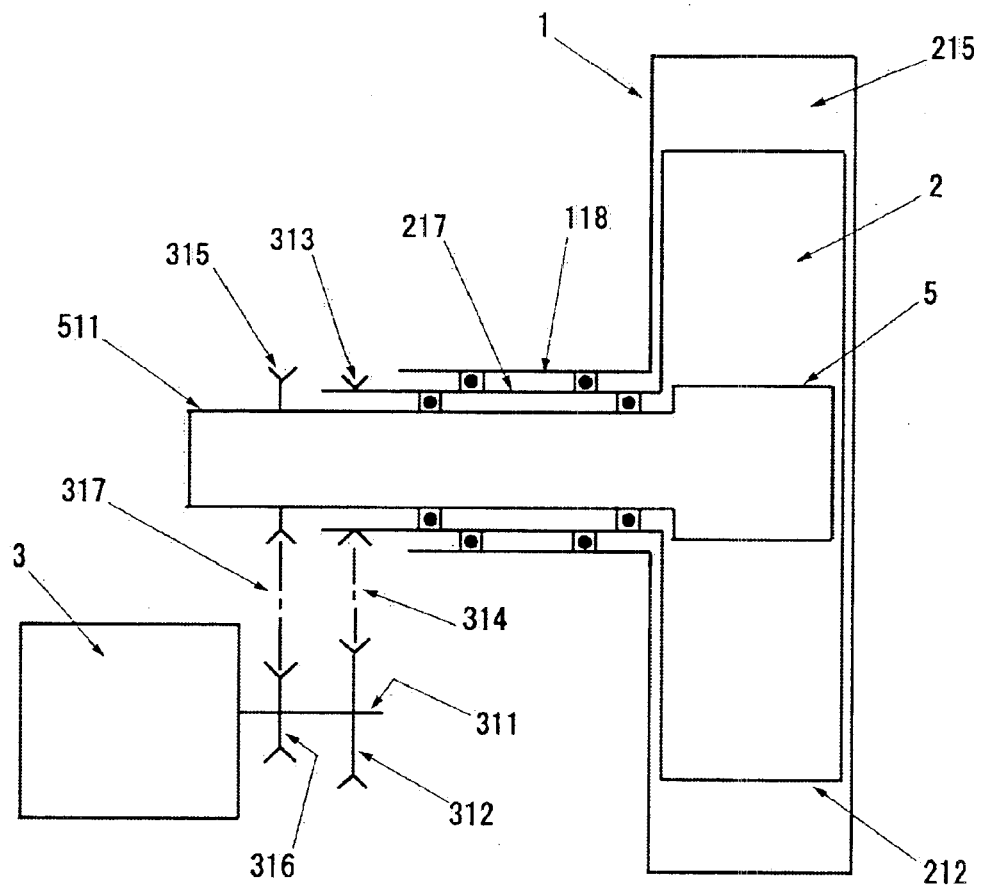
FIG. 10 is a schematic cross sectional view showing another example of a bag filter.

FIG. 10 is a schematic cross sectional drawing showing another example for driving the bag filter 5 of the second embodiment. In the processing apparatus shown in FIG. 10, the rotation operation lever 515 is not provided on the discharge pipe 511, and the structure is such that powder particles on the bag filter 5 are made to fall by causing the bag filter 5 to rotate using drive force of the motor 3. A pulley 315 is provided on the discharge pipe 511 of this embodiment instead of the rotation operation lever 515. Pulleys 312 and 316 are provided next to each other on a motor shaft 311, and a so-called dual rotation axis mechanism is adopted to convey drive force of the motor 3 to the discharge pipe 511 via a transmission belt 317 suspended between the pulleys 315 and 316. With rotation of the dispersion plate 212 and the bag filter 5 by drive force of the motor 3, a transmission ratio is set such that angular velocity of the bag filter 5 and angular velocity of the dispersion plate 212 do not match. Piping for the granulation nozzle 4 is such that an end of the granulation nozzle 4 is jointed with the other end in a rotatable manner so that it is possible to rotate the end integrally with the bag filter 5. In this way, the granulation nozzle 4 provided in the bag filter 5 is prevented from spraying granulation binder fluid to only a specified region of the dispersion plate 212. For the detailed structure of a dual rotation axis mechanism it is possible to reference Japanese patent application No. Hei. 11-43238 (Patent laid-open No. 2002-143705), and with the structure mentioned in this document, the bag filter 5 and the dispersion plate 212 are caused to rotate in the same direction, but they can also be caused to rotate in opposite directions.

Next, a description will be given for the apparatus having this type of structure of a method for carrying out drying treatment while mixing and granulating powder particles, based on FIG. 12 and FIG. 13. Description will be given focusing mainly on the second embodiment, but the first embodiment can also be appropriately referred to. In introducing a fixed amount of powder particles into the inside of the treatment chamber 2, first of all the cover body 112 (102) and cover body 216 are opened with the opening section 112a of the casing 1 facing upwards (vertical type), a specified amount of powder particles are introduced into the treatment chamber 2 and the cover body 112 and cover body 216 are closed. After that, the orientation of the casing 1 is changed to a lateral manner, the powder particles are subjected to centrifugal force by driving the motor 3 to rotate the treatment chamber 2, and powder particles accumulate in a uniform manner at the inner wall surface of the circumferential surface plate 212 (202). By causing heated air introduced to the circulation path 205 (215) to flow into the inside of the treatment chamber 2 via the circumferential surface plate 212 (202), the powder particles are subjected to centripetal force to cause dispersed fluidization, and a fluidized bed is formed.

It is possible to carry out continuous operation by providing the supply discharge pipe for material inside the discharge pipe 511 (501), and it is also possible to easily introduce the specified amount of particles in a short time if powder particles are introduced while rotating the treatment chamber 2. By causing compressed air to flow inside the treatment chamber 2 using the granulation nozzle 4, as required, it is possible to form the fluidized bed smoothly, and it is possible to form a powder layer of uniform thickness in an extremely short time.

At that time, in the first embodiment the height of the treatment chamber 2 is adjusted as required using the bottom surface plate 202a and by supplying heated air from below by employing a porous plate for the bottom surface plate 202a and supplying compressed air from the granulation nozzle 4 before carrying out a granulation operation, it is possible to cause suspended fluidization of the powder particles. In this way, it is possible to form a fluidized bed smoothly from initial operating conditions, and if the adjustment and supply are used together they can be used to assist in uniform formation of a fluidized bed even during operation.

Here, inside the treatment chamber 2 fluidization commences from the particle body layer surface because wind velocity is slightly faster at the inner side of the particle body layer (axial direction) and centrifugal force applied to the powder particles is small. Accordingly, by changing the amount of heated air supplied, even if rotational speed of the treatment chamber 2 is constant, it is possible to control the powder particles from a fixed bed where there is no fluidization to a completed fluidized bed. In FIG. 13, (A), (B) and (C) respectively represent a fixed bed, a partial fluidized bed and a completely fluidized bed.

Figure 12:
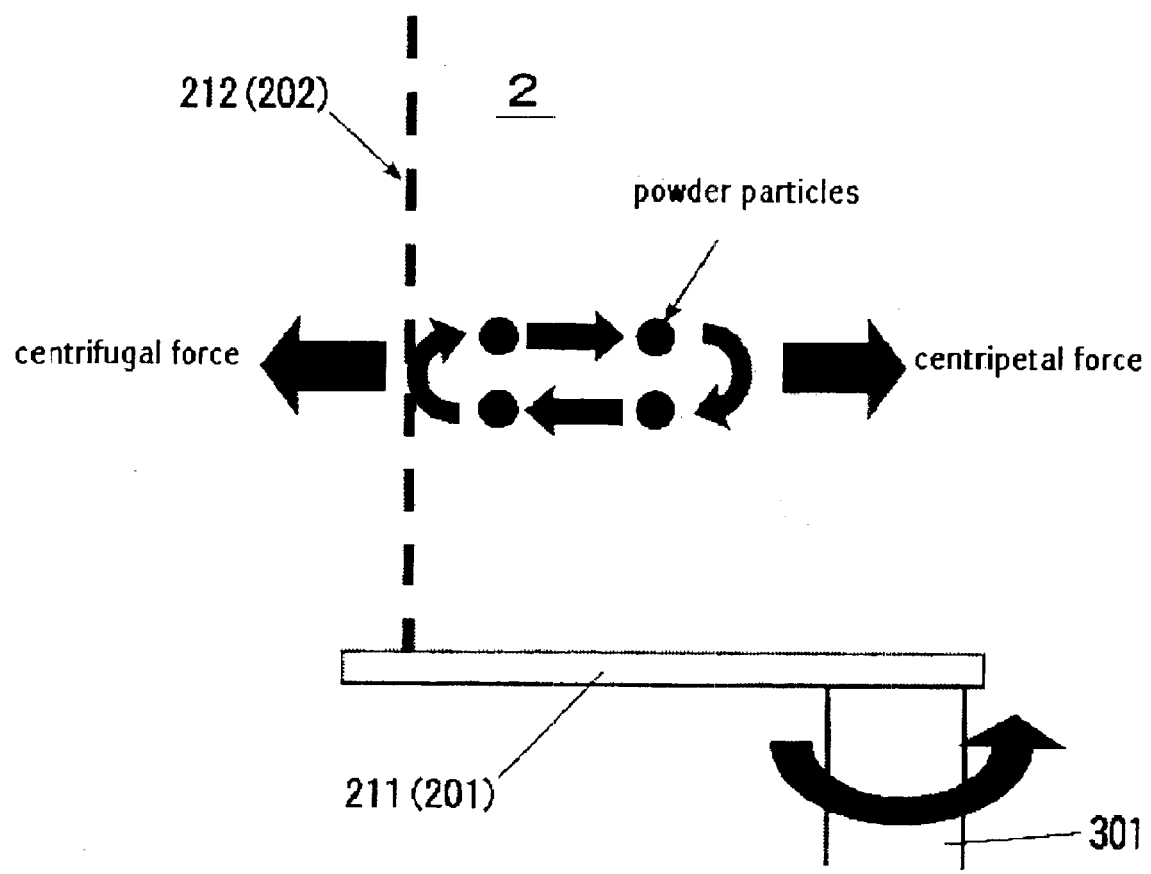
FIG. 12 is drawing for describing the behavior of powder particles.

At a section where the powder particles are being fluidized, respective particles of the powder particles exhibit the microscopic fluidizing behavior shown in FIG. 12 due to balance adjustment of the centrifugal force and the centripetal force. At this time, a pressure difference arises in front of and behind the powder particle layer through which heated air passes, and inside the casing body 1, the inside of the circulation path 215 (205) exhibits high pressure while the inside of the treatment chamber 2 exhibits low pressure. This pressure difference become larger with increase in powder particle layer thickness, rotational speed of the treatment chamber 2 and amount (flow rate) of heated air. If the powder particle layer thickness and the rotational speed of the treatment chamber 2 are constant, the pressure difference increases together with flow velocity, but remains constant once a specified velocity is reached, with this time being a state where there is complete fluidization. This velocity is taken to be the velocity when complete fluidization commences. This minimum fluidization velocity can be calculated logically from a relationship between pressure difference and flow rate of the powder particle layer. Therefore, the behavior of the powder particles inside the treatment chamber 2 brings about a structure that enables sequential behavioral control of a balance between rotational speed of the treatment chamber 2 and air supply amount from a state where the fixed bed is formed causing centrifugal pressing of the powder particles towards the circumferential plate 212 (202) to a state where a fluidized bed is formed causing centripetal dispersion to the axial region, by adjusting the pressure difference between the air circulation path 215 (205) and the inside of the treatment chamber 2.

In the case of the vertical type apparatus of the first embodiment, the powder particles are susceptible to the effects of gravity, which means that in order to cause fluidization of the powder particles a larger flow velocity than the calculated value is required, and since effects of gravity become more severe with smaller particle diameter and bad fluidity, in controlling the apparatus it is preferable to confirm the powder particles used in advance through usage measurement.

Figure 13:
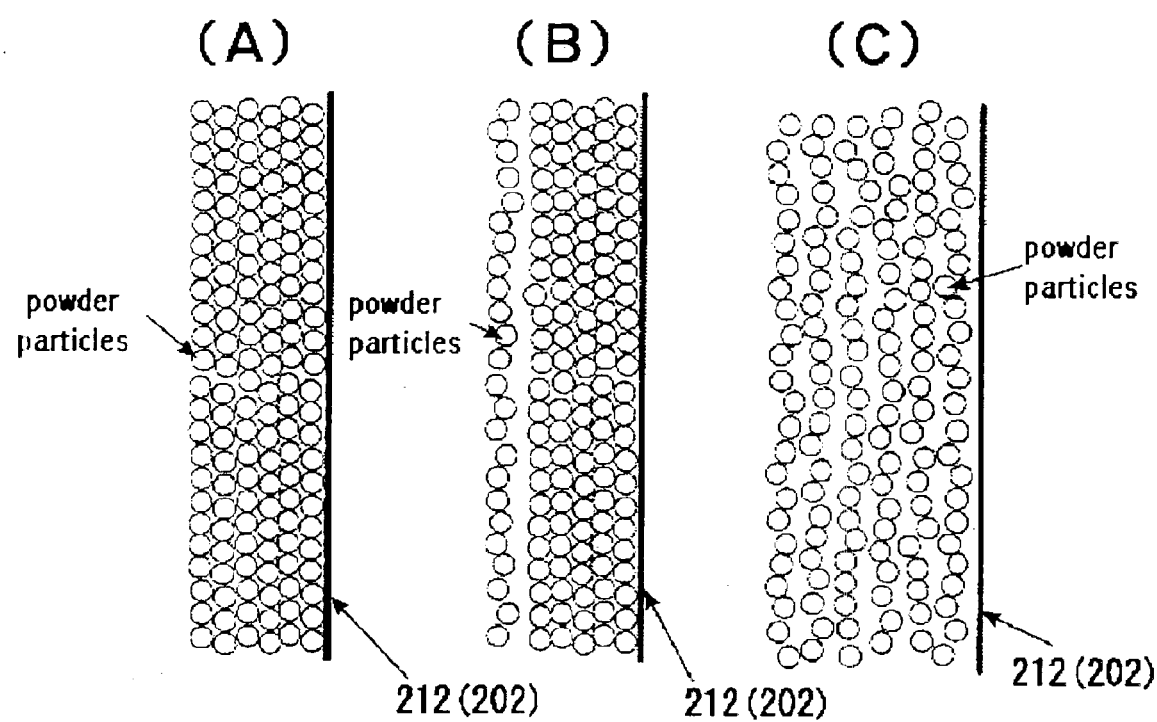
FIG. 13 is an explanatory drawing showing behavioral states of a granulation layer.

According to this type of control means for controlling centrifugal force and centripetal force, it is possible to control behavior of the powder particles shown in FIG. 13. However, even with a fine spray of binder fluid in the fixed bed state (FIG. 13(A)) where the powder particles are completely not fluidized so as to give a state where a layer is only and in a partially fluidized bed where only the inside of the power particle layer is fluidized (FIG. 13. (B)), it is difficult to carry out uniform granulation treatment on the powder particles that have been introduced into the treatment chamber 2. Therefore, normally mixing, granulation and drying are carried out using the complete fluidized bed of FIG. 13(C).

It is also possible to carry out granulation by repeatedly carrying out an operation of subjecting the powder particles to a centrifugal force larger than the centripetal force and compressing the powder particles by pressing to the circumferential plate 212 (202) side, and an operation of exerting centripetal force and centrifugal force in a balanced manner to uniformly fluidize the powder particles, that is, by repeatedly forming the fixed bed of FIG. 13(A) and the complete fluidized bed of FIG. 13(C). It is also preferable to finely spray binder fluid in this case, but since granulation is possible with a small amount of binder fluid it is possible to significantly reduce the energy cost required in drying.

Figure 14:
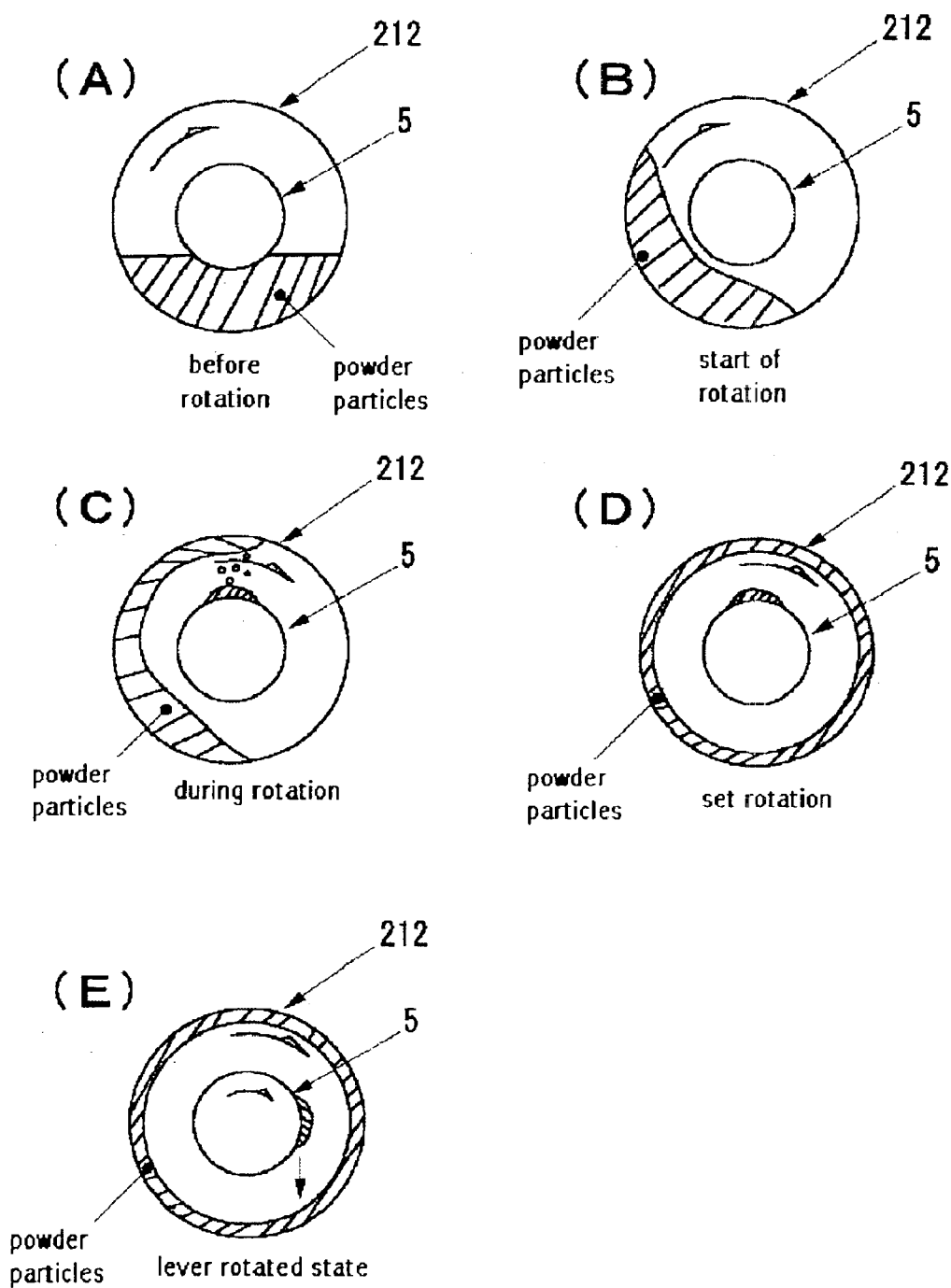
FIG. 14 is an explanatory drawing showing a usage example of a rotation operation lever.

FIG. 14 is an explanatory diagram showing a usage example of the rotation operation lever 515. As shown in FIG. 14, in the case of processing the powder particles, the powder particles are introduced into the treatment chamber 2 (FIG. 14(A)) and the treatment chamber 2 is rotated (FIG. 14(B)). Initial rotation is at a slow rotational speed, and since centrifugal force acting on the powder particles is small, the powder particles drop freely and accumulate on the bag filter 5 (FIG. 14(C)). If the rotational speed of the treatment chamber 2 reaches a specified speed, almost all of the powder particles are formed into a powder particle layer on an inner surface of the dispersion plate 212 due to centrifugal force, and since centrifugal force is not exerted on the powder particles that have accumulated on the bag filter 5 it is maintained in that state (FIG. 14(D)). If the rotation operation lever 515 is then operated to rotate the bag filter 5 by about 90°, the powder particles that have accumulated on the bag filter 5 fall down (FIG. 14(E)) and is assimilated into the powder particles forming the layer on the inner surface of the dispersion plate 212 due to gravity and centrifugal force.

As a method that does not use the rotation operation lever 515, it is possible to utilize a structure where the above described bag filter 5 is caused to rotate by the drive force of a motor 3, to cause the powder particles on the bag filter 5 to drop off. Alternatively, it is possible to utilize a structure that uses a retainer and bag shaped bag cloth for covering the retainer, and to intermittently blow compressed gas from the discharge pipe 511 to instantaneously inflate the bag cloth and cause the powder particles to fly off.

In the embodiment of the present invention having the above described structure, mixing, granulation and drying are carried out by forming a fluidized bed of powder particles inside the treatment chamber 2. With the apparatus, the treatment chamber 2 is configured to be capable of causing rotation of a circumferential plate 212 (202) about an axis, as ventilation means constituted by a dispersion plate, and also, heated air supplied from the gas inflow means via this rotatable circumferential plate 212 (202) is introduced to the inside of the treatment chamber 2. As a result, in the fluidized bed of the present apparatus, behavior of the powder particles inside the treatment chamber 2 is controlled by control means for controlling centrifugal force due to rotation of the treatment chamber 2 and centripetal force due to the inflow of heated air. This means that with respect to powder particles inside the treatment chamber 2 it is possible to supply the effect of forces from opposing directions, namely the centrifugal force and centripetal force, in a balanced manner, and behavior control is possible to cause dispersive fluidizing while maintaining a state where the powder particles are allowed to accumulate uniformly inside a specified region at the circumferential plate 212 (202) side. Also, even if heated air required to uniformly disperse the powder particles is supplied, since centrifugal force acts on the powder particles, a good fluidized bed is formed where there is no danger of the powder particles being blown off as with the fluidized bed apparatus of the related art, and it is possible to treat fine particle powder in the micron and submicron range.

It is also possible to easily carry out a balance adjustment operation for the centrifugal force and the centripetal force using control means, and for the powder particles it is possible to carry out behavior control so that a fixed bed, partially fluidized bed and completely fluidized bed are appropriately formed. As a result, during the granulation treatment, from a fixed bed to a complete fluidized bed are repeatedly formed, and it is anticipated that processing efficiency will be improved by carrying out compression treatment of the powder particles, in addition to cohesive force and adhesive force possessed by the source powder particles itself, to make it possible to generate a strong granulated material.

Further, behavior of the powder particles is such that the powder particles accumulates inside a specified region at the circumferential plate 212 (202) side to form a fluidized bed, it is possible to arrange the granulation nozzle 4 and bag filter 5 in a rotational center region inside the treatment chamber 2 without there being any negative influence on the fluidization process, and it is possible to make practical use of space inside the treatment chamber 2.

The treatment chamber 2 of this embodiment is formed in a cylindrical shape, but this is not limiting and it is also possible to form the chamber in a truncated cone shape or with a central section expanded as long as the cross section at an arbitrary position is a concentric circle, and a completely or partial dual cylinder structure is also possible. In the case of using a shape other than a cylinder for the treatment chamber 2, powder particles that have accumulated at the circumferential plate 212 (202) side form a fluidized bed that is inherent to the shape of the treatment chamber 2, for example having a partially different thickness, and it is possible to carry out mixing, granulation and drying treatment using this type of treatment chamber 2.

A circulation path 215 (205) for air is formed between the inner wall surface of the casing body 1 and an outer surface region of the circumferential plate 212 (202) maintaining a specified space, and the gas inflow means is comprised of supply port 113 (103) for introducing heated air from the supply device (blower 6) and the circulation path 215 (205). As a result, heated air is made the same pressure inside this circulation path 215 (205) making it possible to cause uniform dispersive flow inside the treatment chamber 2. This circulation path 215 (205) has, for example, openings of ventilation holes in the circumferential plate 212 (202) that are larger than powder particles, and the powder particles are discharged to the circulation path 215 (205) side during treatment air flows into the treatment chamber 2 through the circumferential plate 212 and flow path for discharging to the bag filter 5 is formed which means that discharged powder particles can be re-introduced into the treatment chamber 2.

The gas inflow means is made up of the supply port 113 (103) and circulation path 215 (205), as described previously, but this is not limiting and it is not essential to provide the circulation path 215 (205) as long as the structure equally supplies heated air to the circumferential plate 212 (202) from the outer surface region thereof.

The supply port 113 (103) is arranged at a side surface of the casing 1 so as to supply heated air towards the same rotational direction as the treatment chamber 2. As a result, heated air that has been supplied from the supply port 113 (103) to the circulation path 215 (205) flows in a constant direction (rotation direction of the treatment chamber 2) inside the circulation path 215 (205), and smoothly flows dispersively into the inside of the treatment chamber 2, uniformly from the ventilation holes of the circumferential plate 212 (202), which means that it is possible to exert equal centripetal force on the powder particles.

Discharge means including the bag filter 5 for discharging heated air that has flowed in to the inside of the treatment chamber links to a central region of the treatment chamber 2, and heated air inside the treatment chamber 2 can be efficiently discharged from a rotational center regions without exerting any detrimental effect on the behavior of the powder particles. By making it possible to arrange the bag filter 5 at the central region, the overall apparatus can be made compact by making effective use of the rotational central region.

The control means is configured so that it is possible to control behavior of the powder particles from a fixed bed formation state, where the powder particles are centrifugally pressed to the circumferential plate 212 (202) side to accumulate at a uniform thickness, to a fluidized bed formation state, where the powder particles are centripetally dispersed in the axial direction, by balance adjustment of the rotational speed of the treatment chamber 2 and the supplied amount of air. Accordingly, using the control means, balance adjustment of the centrifugal force and centripetal force can be carried out easily, and it is possible to carry out processing of the powder particles using behavior control to appropriately form a fixed bed, a partial fluidized bed and a complete fluidized bed. During granulation processing, granulation becomes possible using behavior control to repeat the compression in the fixed bed formation state and the dispersion in the fluidized bed formation state, and it is anticipated that processing efficiency will be improved by carrying out compression treatment of the powder particles, in addition to cohesive force and adhesive force possessed by the source powder particles itself, to make it possible to generate a strong granulated material.

The granulation nozzle 4 is provided inside the treatment chamber 2 at a central section, and granulation binder fluid is finely sprayed from the granulation nozzle 4 towards the circumferential plate 212 (202) direction. As a result, since the granulation binder fluid itself is also uniformly sprayed to the circumferential plate 212 (202) side due to the centrifugal force, it is possible to wet the powder particles efficiently and to perform granulation treatment.

With this apparatus, the structure is such that together with the inflow of gas through the porous circumferential plate 212 to the cylindrical treatment chamber 2 holding the powder particles, gas flowing into the treatment chamber 2 is discharged to the outside of the treatment chamber 2 through the bag filter, and also, together with formation of the circulation path 215 for gas by means of the circumferential plate 212 at an outer side of the treatment chamber 2, the bag filter 5 is arranged at an axial inner section of the treatment chamber 2, with the circumferential plate being capable of rotation in a direction around the bag filter 5. Accordingly, it is possible to cause centrifugal force to act on the powder particles in accordance with rotation of the circumferential plate 212, while gas flows in from the outer side treatment chamber 2 through the circumferential plate 212, and even if there are fine particles of powder in the micron or submicron range it is possible to carry out various treatments such as mixing, granulation, coating, drying and reaction while controlling the behavior of the powder particles. Furthermore, in a rotation center region where there is no detrimental effect on the behavior of the powder particles inside the treatment chamber 2, the entire filter surface of the bag filter 5 is used uniformly making it possible to discharge the inflowing gas in an equally dispersed manner, unevenness of the gas is avoided and it is expected that behavior control to achieve balance of the centrifugal force and the centripetal force will be simplified contributing to formation of a uniform and stable fluidized bed, and it is also anticipated that it will be possible to improve processing efficiency dramatically.

Since the granulation nozzle 4 is provided inside the bag filter 5, not only is it possible to spray granulation binder fluid from a central part of the treatment chamber 2, it is also possible to simplify the structure by also using the bag filter 5 as a support member for the granulation nozzle 4.

The bag filter 5 is structured to be rotatable around its circumference, and is rotated using a rotation operation lever 515 (operation means), which means that it is possible to easily cause the powder particles that have accumulated on the bag filter 5 to drop off. Further, in another embodiment the bag filter 5 is structured to be rotatable about its circumference and rotated by a motor 3 (drive means), which means that operation of the rotation operation lever 515 is not required and it is also possible to cause forced separation of the powder particles on the bag filter 5 using centrifugal force and to prevent clogging of the bag filter 5.

Because the angular velocity of the bag filter 5 and the angular velocity of the circumferential plate 212 different, the relative position of the granulation nozzle 4 and the circumferential plate 212 is varied and it is possible to spray granulation binder fluid to the powder particles without bias.

By intermittently blowing compressed air from a compressor to the bag filter 5, fine powder particles shaken off the filter surface are mixed in with the powder particles forming the powder particle layer inside the treatment chamber 2, which means that there is no problem of component separation.

The motor 3 and discharge pipe 511 (gas discharge path) are arranged at an outer rear side of the treatment chamber 2, and since a cover body 216 and cover body 112 for opening and closing the treatment chamber 2 are arranged at the front of the treatment chamber 2 the structure is such that the treatment chamber 2 is closed inside the casing 1 and construction is made relatively simple. As a result, it is possible to make opening and closing and encapsulation of the treatment chamber 2 simple compared to the first embodiment.

The cover body 216 and the cover body 112 are formed from transparent material, which makes it possible to control the behavior of the powder particles while confirming the condition of the powder particles through observation.

By providing the casing body 1 provided with the treatment chamber 2 so that the rotational axis of the circumferential plate 212 faces in the horizontal direction, and having a structure enabling rotation about a support shaft 116a that is horizontal and orthogonal to the rotational axis as a fulcrum, at the time of processing the powder particles it is possible to give the fluidized bed apparatus a horizontal structure, and compared to a apparatus having that structure vertically it is possible to form a favorable fluidized bed avoiding unevenness of the powder particles due to gravity, and since it is easy for the powder particles to collect uniformly at the inner wall surface side of the circumferential plate, it is possible to easily obtain a fluidized bed that has been uniformly dispersedly fluidized. As a result, volume adjustment of the inside of the treatment chamber 2 using the bottom surface plate 202a is no longer necessary, transit dispersion of inflowing air by the circumferential plate 212 is made uniform, and there is the advantage that it is easy to perform behavioral control of the fluidized bed.

When not processing, it is possible to easily carry out introduction and removal of the powder particles by rotating the casing body 1 so that the opening section 112a of the casing 1 faces upwards. Also, since it is possible to alter the structure of the casing 1 from a vertical type to a horizontal type, it is possible to use either a vertical type or a horizontal type, enabling treatment using an orientation changing process including a variation in inclination through a range of 0–90°.

The treatment apparatus body is rotated by means of a reduction gear mechanism including a worm 814, which means that it is possible to reduce the handle operation force by ensuring a large reduction ratio, and it is also possible to fix the casing 1 at an arbitrary position by a braking action of the worm 814.

Figure 15:
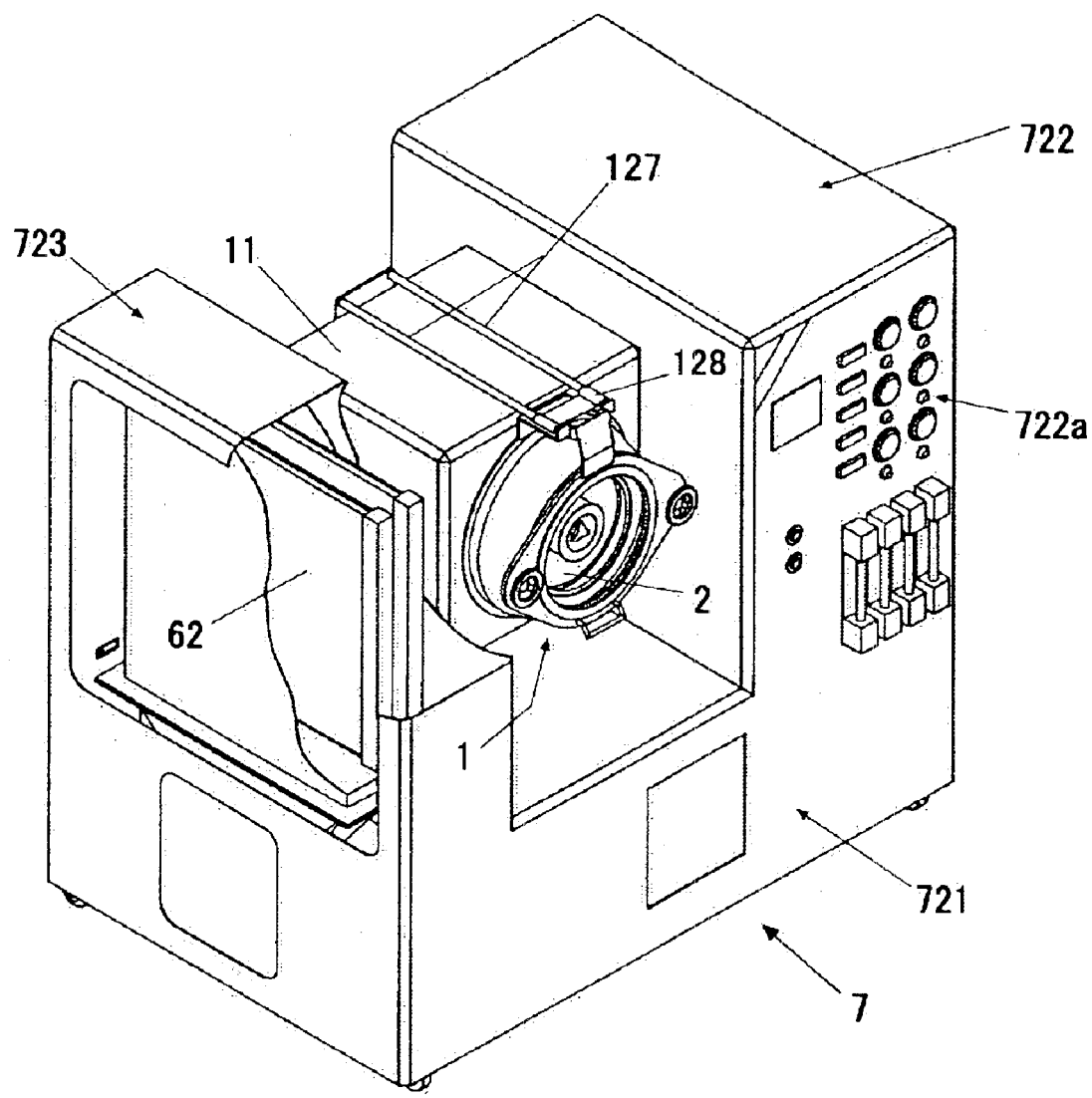
FIG. 15 is an overall perspective view of a fluidized bed apparatus of a third embodiment.
Figure 16:
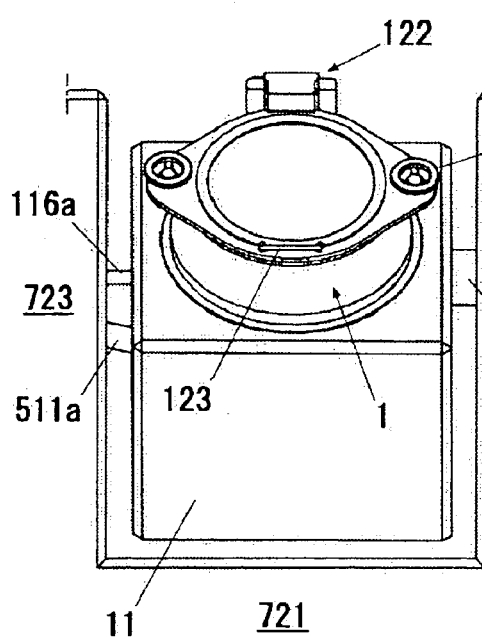
FIG. 16 is an explanatory drawing for the operation of a casing body.
Figure 16:
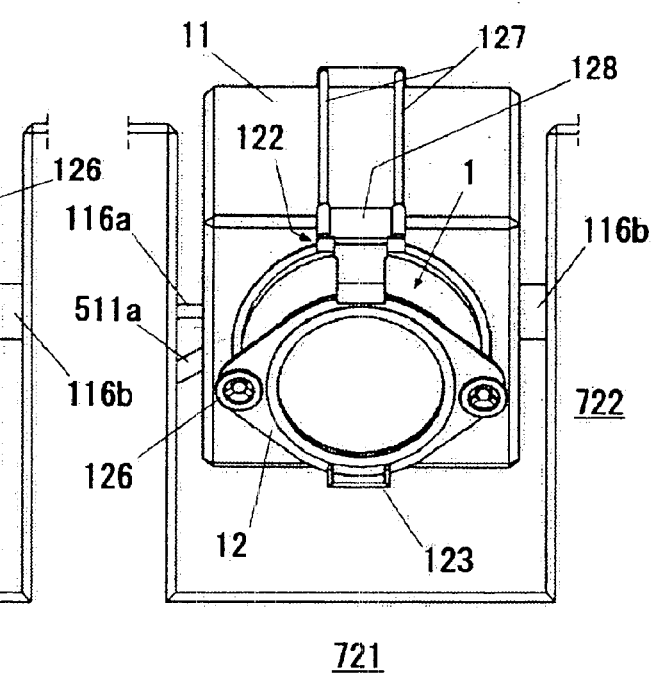
Figure 17:
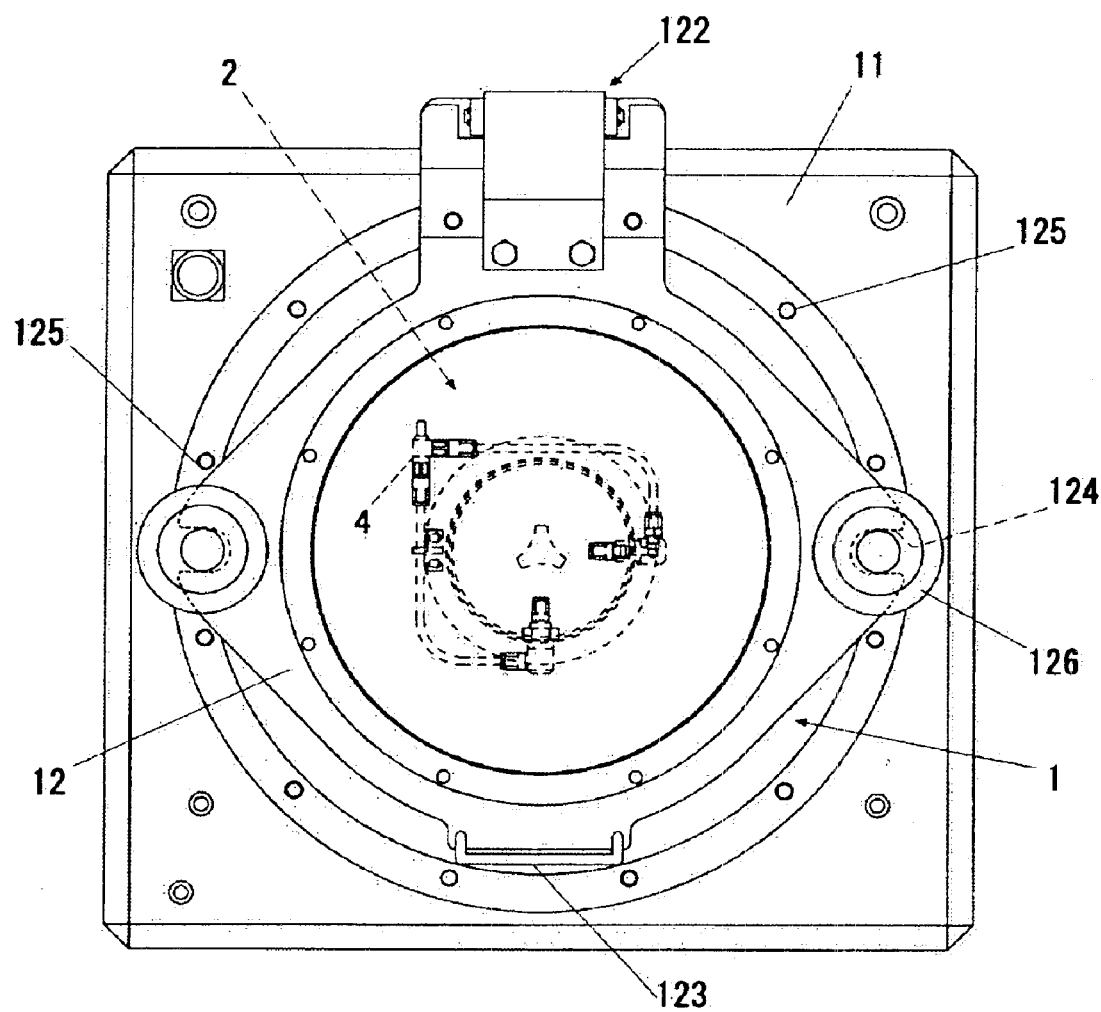
FIG. 17 is a front view showing a casing body section of a fluidized bed apparatus.
Figure 18:
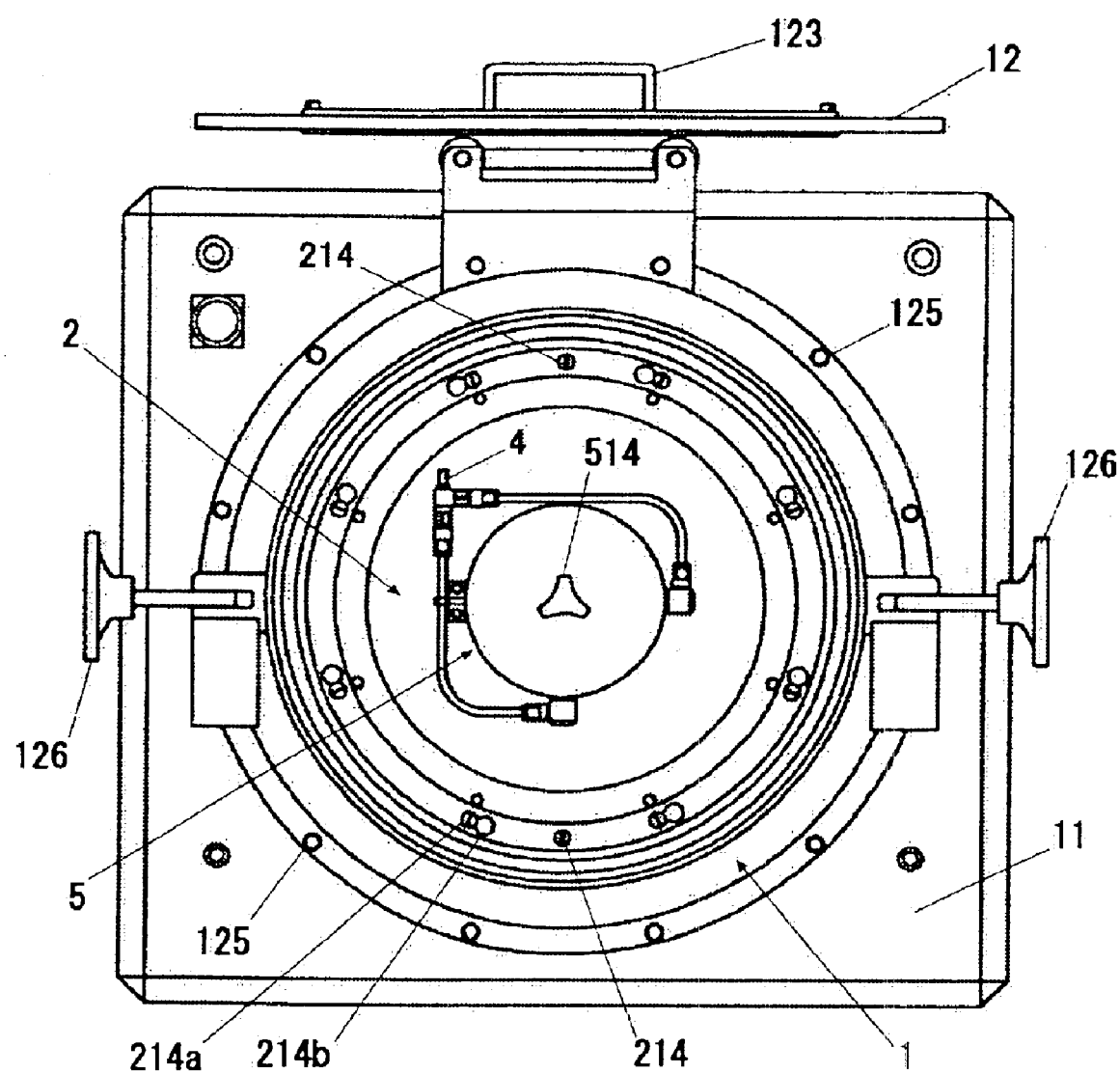
FIG. 18 is a front view showing a state where an outer cover of the casing body is open.
Figure 19:
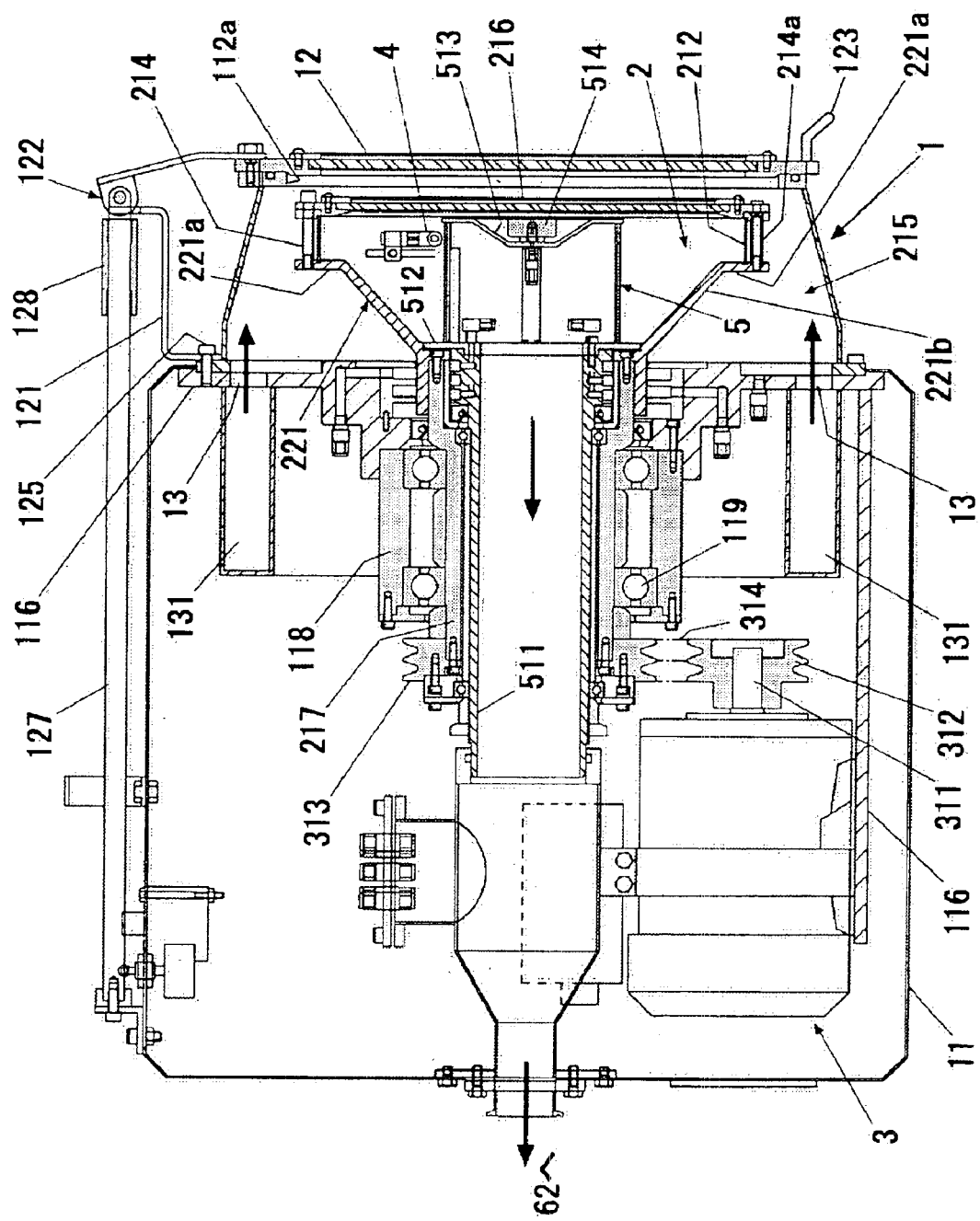
FIG. 19 is a side cross-sectional view showing a casing body section.
Figure 20:
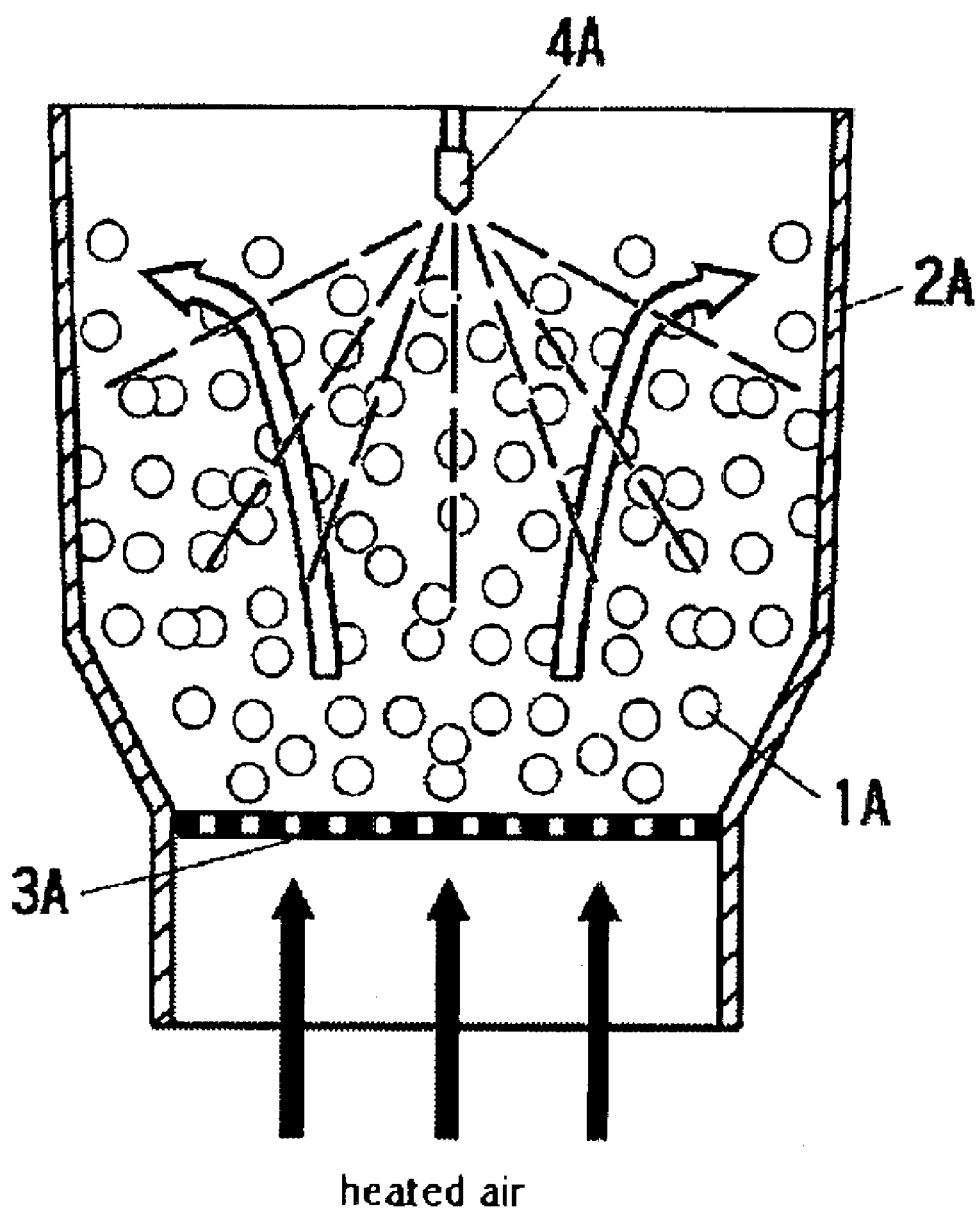
FIG. 20 is an essential cross-sectional drawing of a drying and granulation apparatus of the related art.

Based on FIG. 15 to FIG. 19, a description will now be given of a fluidized bed apparatus for powder particles representing a third embodiment of the present invention. FIG. 15 is an overall perspective view of the fluidized bed apparatus, FIG. 16 is an explanatory drawing for operation of a casing body, FIG. 17 is a front view showing a casing body section of the fluidized bed apparatus, FIG. 18 is a front view showing a state where an outer cover of the casing body is open, and FIG. 19 is a side cross-sectional view showing a casing body section. This third embodiment is an improvement to the second embodiment, and the same reference numbers are used to represent members shared with the second embodiment. As shown in these drawings, the casing body 1 of the fluidized bed apparatus is a cylindrical truncated cone type having an opening section 112a at a front surface section, and internally comprises a cylindrical treatment chamber 2 for treating powder particle material, an air inflow path (circulation path) 215 formed between the treatment chamber 2 and an inner wall surface of the casing, and a bag filter 5 arranged at an axial section of the inside of the treatment chamber 2.

The air inflow path 215 is formed between the inner wall surface of the casing 1 and an outer surface region of the circumferential plate (dispersion plate) 212 as ventilation means for the treatment chamber 2. The casing 1 is integrally fixed to a body bracket 116 having a substantially L-shaped cross section using bolts 125 at a rear surface section of the casing. The opening section 112a at the front surface section of the casing 1 is covered by a substantially rhomboid flat disk-shaped outer cover body 12 containing circular transparent acrylic resin. The outer cover 12 is attached at an upper part to a hinge section 122 of a slide body 128 tip end so as to be capable of opening and closing upwards and downwards. The outer cover 12 also has a grip handle 123 at a lower part and left and right slot sections 124, 124. To open and close the outer cover 12, left and right take-up handles 126, 126 provided at outer side surfaces of the casing 1 capable of rotating horizontally are respectively joined to the slot sections 124, 124 and the outer cover 12 is press-fitted to the casing 1 (opening section 112a) by tightening to close the door, and the operation is reversed to open the door. The outer cover 12 in the open state can be stowed by sliding the slide body 128 provided so as to be capable of sliding with respect to guide bars 127 rearwards along the guide bars 127, and the guide bars 127 have front ends respectively supported in a frame 121 bent in a stepped shape viewed from the side, and rear ends respectively supported on an upper part of a case cover 11.

Supply ports 13 for introducing specified gas (various gas such as heated air, inert gas, etc.) into the air circulation path 215 are formed in the bracket 116 constituting the rear surface section of the casing 1 forming the inner wall of the air circulation path 215, facing a surface region of the outer circumferential surface of the treatment chamber 2. The supply ports 13 are holes of about 30mm diameter provided at 12 places in total at specified intervals. Gas introduced from these supply ports 13 is caused to circulate along the inner periphery of the casing 1 accompanying rotation of the treatment chamber 2 that is, rotation of the dispersion plate 212 about the axis as ventilation means, and gas inflow means is constituted by the air circulation path 215 and the plurality of supply ports 13. A gas supply chamber 131 for equally distributing air from the gas supply device (not shown in the drawings) provided inside a frame 7, which will be described later, is provided at a rear surface side of the supply ports 13, and in the case of introducing heated air, for example, air generated by a blower, as gas supply means is heated by a heater and guided into the gas supply chamber 131.

The supply ports 13 are not limited to being circular, and it is also possible to form them in an arbitrary shape, such as elliptical. It is also possible to provide a plurality of smaller supply ports 13 at an arrangement region of one supply port 13, or to form the supply ports so as to impart directivity to an air jet.

The treatment chamber 2 is formed by making a substantially truncated cone shaped rear fixed plate 221 and a disc shaped inner cover 216 containing circular transparent acrylic resin face each other at a specified distance, and fitting the cylindrical dispersion plate 212 between them as ventilation means. The inner cover 216 can be attached to and removed from the fixed plate 221. The fixed plate 221 comprises a ring-shaped upright section 221a rising up in an axial direction from the dispersion plate (circumferential plate) 212 and having an arbitrary width, and an inclined section 221b extending from the upright section 221a. A plurality of bolt pins 214a are provided on the upright section 221a, and a plurality of attachment holes 214b, each of which is formed by integrally connecting large and small holes, are provided in the inner cover 216. In attaching the inner cover 216 to the fixed plate 221, large holes of the attachment holes 214b are fitted over bolt heads of the bolt pins 214a, and abut against the bolt heads by rotating the inner cover 216 to the small hole side and fixing using upper and lower bolts. When removing the inner cover 216 it is possible to carry out the reverse operation and it is possible to attach and remove the inner cover 216 together with the dispersion plate 212. The dispersion plate 212 is arranged a specified distance from the inner wall surface of the casing 1 and gas that has been introduced to the air (gas) circulation path 215 flows into the inside of the treatment chamber 2 through the dispersion plate 212.

The granulation nozzle 4 for two-fluid fine spraying is provided inside the treatment chamber 2. The granulation nozzle 4, is connected through piping to a binder supply device, not shown, and a compressor, not shown, and a specified granulation binder fluid supplied from the supply device is sprayed to the inside of the treatment chamber 2.

The dispersion plate 212 can be appropriately replaced by a dispersion plate of differing hole diameter or material properties depending on the particle size of the powder particles to be processed, and it is possible to use a porous plate, slits, metal mesh, multi-layer metal mesh or metal fiber etc. For example, a multi-layer metal mesh is formed by overlaying a plurality of meshes having different mesh sizes, and sintering at a specified pressure and temperature, and it is possible to prevent clogging with powder particles by forming a metal mesh of a fine mesh size.

A cylindrical rotation support shaft 217 extending rearwards is integrally connected to a central part of the rear fixed plate 221, and the rotation support shaft 217 is rotatably supported via a pair of bearings 119 at an inner periphery of a cylindrical holder 118 integrally provided on the body bracket 116. A motor 3 (drive unit) is arranged beneath the rotation support shaft 217. A pulley 312 integrally provided on the motor shaft 311 and a pulley 313 integrally provided on the rotation support shaft 217 are connected together via a transmission belt 314. In this way it is possible to rotate the treatment chamber 2 in response to drive of the motor 3 and to impart centrifugal force to the powder particles inside.

The bag filter 5 is formed from a cylindrical mesh plate, and is fitted between a disk-shaped rear plate 512, having an opening section at a middle part, and a disc shaped front plate 513 having a central part formed in a U-shape, that are caused to face each other with a specified distance between them. The rear plate 512 and the front plate 513 are connected using butterfly bolts 514 provided in the middle, and it is possible to attach and detach the front plate 513 and the bag filter 5 by tightening or loosening the bolts 514. The configuration of the bag filter 5 is such that it is arranged a specified distance from the dispersion plate 212, and an arrangement proportion inside the treatment chamber 2 is wider than the surface width of the dispersion plate 212 or larger than the surface area of the dispersion plate 212, with gas that has flowed into the treatment chamber 2 through the dispersion plate 212 being discharged through the bag filter 5.

The bag filter 5 can be appropriately replaced with one of a different hole diameter or material depending on the particle diameter of the powder particles to be processed, and as well as material that is the same as that used for the dispersion plate 212, it is possible to form the filter cylindrically using a retainer and bag-shaped bag cloth (woven or non-woven fabric) formed from various materials for covering the retainer, or alternatively to form the bag filter 5 in a bellows shape in order to ensure surface area.

A cylindrical discharge pipe 511 extending rearwards is integrally connected to a central opening part of the rear plate 512, and gas discharged from the treatment chamber 2 to the bag filter 5 is discharged outside of the apparatus (outside the system) via the discharge pipe 511. The discharge pipe 511 is rotatably supported at the inner periphery of the rotation support shaft 217.

A backwash nozzle, not shown, is provided inside the bag filter 5, and compressed gas is instantaneously or intermittently sprayed to peel away particulate matter that has become attached to the bag filter 5, and returned to the dispersion plate 212 side. Utilizing the structure where the bag filter 5 uses a retainer and bag-shaped bag cloth for covering the retainer, it is possible to instantaneously inflate the bag cloth using compressed gas to cause the powder particles to fly off.

A pair of support shafts 116a, 116b are respectively attached to attachment surfaces formed on left and right sides of the body bracket 116. The body bracket 116 is fitted by rotatably pivoting to the frame 7 via these support shafts 116a, 116b. The frame 7 is formed substantially in a U-shape in front view, so that various equipment (not shown) is housed in the bottom section 721 and left and right upright side sections 722, 723, and the upright side sections 722 and 723 constitute support sections (support frames) for pivoting the support shafts 116a and 116b. The casing body 1 is then capable of rotation upwards and downwards in the U-shaped space. A gas supply device containing a blower and a heater etc. is provided inside the bottom section 721. An operation control device is equipped inside the upright side section 722, for controlling various drives, such as the motor for causing upward and downward rotation of the casing body 1 using the operation panel 722a, and a control panel for controlling centrifugal and centripetal force on the powder particles inside the treatment chamber 2. A collection bag filter 62 for collecting powder particles that have passed through the bag filter 5 and been discharged outside the system from the discharge pipe 511 via the piping hose 511a is fitted inside the upright side section 723.

The support shaft 116b is tubular, and the inside of this tube is used for housing a gas supply tube connecting the gas supply device and the gas supply chamber 131, to pass wiring to the motor 3, etc. therethrough, and to connect various devices at the casing 1 and frame 7 side.

In this manner, the casing 1 is constructed capable of varying rotation of a rotation shaft of the treatment chamber 2 from above to below, and it can be used in either case of a vertical type where the rotation shaft of the treatment chamber 2 is vertical, or a horizontal type where the rotation shaft is horizontal. In this apparatus, powder particles are introduced with the opening section 112a of the casing 1 facing upwards (rotation axis in the vertical direction), as shown in FIG. 16(A), the powder particles are processed with the opening section 112a facing sideways as shown in FIG. 15 (rotation axis in the horizontal direction), and powder particles are removed with the opening section 112a facing downwards (rotation axis in the vertical direction), as shown in FIG. 16(B).

Next, a description will be given of a method of carrying out drying treatment while mixing and granulating powder particles, for the apparatus having this type of structure. In introducing a constant amount of powder particles into the treatment chamber 2, first of all the outer cover 12 and the inner cover 216 are opened with the opening section of the casing 1 sloping upwards, a constant amount of powder particles is introduced into the treatment chamber 2 and the outer cover 12 and the inner cover 216 are closed. After that, the orientation of the casing 1 is changed to a lateral manner, centrifugal force is applied to the powder particles by causing rotation of the treatment chamber 2 by driving the motor 3, and the powder particles accumulate uniformly on the inner wall surface of the circumferential plate 212. On the other hand, heated air that has been guided to the inflow 215 is made to flow to the inside of the treatment chamber 2 through the circumferential plate 212 to cause dispersive fluidization of the powder particles by subjecting them to centripetal force, and forming a fluidized bed.

By providing a material supply discharge pipe inside the discharge pipe 511, it is possible to operate continuously, and if powder particles are introduced via the supply discharge pipe while rotating the treatment chamber 2 it is possible to simply introduce a specified amount of powder particles in a short time. By causing compressed air to flow inside the treatment chamber 2 using the granulation nozzle 4, as required, it is possible to smoothly form a fluidized bed and it is also possible to form a powder layer of uniform thickness in an extremely short time.

Here, inside the treatment chamber 2, although only slight, the wind velocity is faster at the inner side of the powder particle layer (axial direction), while centrifugal force acting on the powder particles is smaller, which means that fluidization commences from the powder layer surface. As a result, even if the speed of rotation of the treatment chamber 2 is constant, by varying an amount of heated air supplied it is possible to form a fixed bed where the powder particles are not fluidized, a partially fluidized bed and a completely fluidized bed, as described in Japanese Patent Laid-open No, 2002-119843.

In a third embodiment of the present invention having this type of structure, a fluidized bed of powder particles is formed by gas flowing into a cylindrical treatment chamber 2 from a circumferential surface region, and mixing, granulation and drying treatment is carried out. At this time, at a dispersion plate (circumferential plate) 212 side, as ventilation means, being the outermost section of the treatment chamber 2, and at a bag filter 5 side at a central section, the flow rate is faster at the central side, as result of which it becomes easier for finer particles accompanying the gas flow to move to the central section and a phenomenon arises where it is difficult for the moved particles to return to the circumferential surface region. Also, when blockage of the bag filter 5 occurs discharge efficiency becomes bad and there is a danger of pressure drop and the balance between centrifugal force and centripetal force collapsing.

However, the bag filter 5 provided in the treatment chamber 2 of this apparatus has an arrangement proportion inside the treatment chamber 2 that is wider than the surface region width of the dispersion plate 212 forming the outer surface region, or larger than the surface area of the dispersion plate 212.

In this way, gas that has flowed into the treatment chamber 2 can cause discharge rate to be slowed at an axial region inside the treatment chamber 2 where centrifugal force is weak and discharge rate is fast, efficient discharge of airflow is obtained while balancing centripetal force and centrifugal force on the powder particles regardless of the particle diameter, uneven gas flow is avoided and it is possible to carry out drive control for optimum inflow and discharge of gas for fluidized bed behavior. Further, it can be planned to improve product collection rate by reducing the amount of powder particles attaching to the bag filter 5 accompanying airflow, and amount of powder particles discharged by passing through from the bag filter, and it is further possible to improve control characteristics for powder particles inside the treatment chamber 2 such as being able to form a good fluidized bed by exerting forces in opposing directions, namely centrifugal force and centripetal force, in a well balanced manner. Also, it is possible to carry out an adjustment operation for the balance between the centrifugal force and centripetal force extremely easily using control means, and it is possible to plan to improves processing efficiency by reliably processing fine powder particles in the micron and sub micron range.

The arrangement proportion of the dispersion plate 212 and the bag filter 5 inside the treatment chamber 2 is realized by forming the treatment chamber 2 in a truncated cone shape. That is, a large overall central region that is set is effectively utilized and makes the arrangement region for the bag filer 5 by forming an upright section 221a that is upright and has an arbitrary height and width from a dispersion plate 212 side, and an inclined region 221b extending towards the rear from the upright section 221a, with respect to an axial direction of the treatment chamber 2. As a result, with respect to powder particles at an axial region side inside the treatment chamber 2 where centrifugal force is weak, by slowing down flow rate at the inclined section together with discharge action to the discharge pipe 511 side to weaken centripetal force, even if there is attachment to the bag filter 5, it is possible to cause powder particles to move smoothly to the upright section 221a side to form a fluidized bed, including powder particles that are made to fly off by a backwash nozzle.

The treatment chamber 2 of this embodiment has the rear fixed plate 221 formed in the shape of a truncated cone, but the shape of the treatment chamber 2 is not limiting. It is also possible to form the inner cover body 216 in a truncated cone shape, and also to form both the rear fixed plate 221 and inner cover body 216 in truncated cone shapes to give an overall diamond shape when viewed from the side.

By forming the inclined section 221b facing to the rear of the casing 1 (bracket 116 side), it is possible to smoothly move the powder particles to the upright section 221a side and also to use a space appearing at the rear surface side of the inclined section 221b as the air circulation path 215 to make the air circulation path 215 inside the casing 1 large, which makes it possible to increase the amount of heated air accumulated inside the air circulation path 215 (casing 1), to make the pressure either side of the dispersion plate 212 much closer to equal, and to achieve uniform dispersive inflow inside the treatment chamber 2.

By making the gas inflow means using the air inflow path 215, formed between the casing 1 and the dispersion plate 212, and the plurality of supply ports 13 being a specified distance from an inner wall forming the air flow path 215, it is possible to cause air to flow in uniformly from the entire surface region of the dispersion plate 212 to the inside of the treatment chamber, without gas supplied to the air inflow path 215 circulating excessively. Also, because the supply ports 13 can be made small, it is possible to manufacture a supply structure without the gas supply path projecting to the exterior surface of the casing 1. As a result, arrangement of the casing 1 and treatment chamber 2 and connection to the gas supply device can be optimized, the gas supply structure for the overall apparatus is simplified and manufacture is made easy.

Since the supply ports 13 are provided in the bracket 116 forming the inner wall of the inflow path 215, it is possible to have gas supplied from the supply ports 13 flow out in a direction parallel to the dispersion plate 212, direct outflow (blowing) to the dispersion plate 212 is avoided, it is possible to equalize pressure inside the inflow path 215 in a state where there is no circulation due to supply of heated air, and it is possible to make a circulation path due to circulation arising from rotation of the dispersion plate 212.

The supply ports 13 can also be provided in the casing 1 forming the inner wall of the inflow path as well as in the bracket 116, and naturally the inflow direction of the air is arbitrary.

Further, a donut shaped (annular) gas supply chamber 131 for distributing air from the gas supply device to each of the supply ports 13, 13 . . . is provided next to the rear surface side of the supply ports 13 (bracket 116), and the supply ports 13 are linked to this gas supply chamber 131. Air supplied from the gas supply device is temporarily built up inside this gas supply chamber 131 and air can be supplied equally to each of the supply ports 13, 13 . . . and discharged to the inside of the inflow path 215. The gas supply chamber 131 can be arranged at a rear surface side of the bracket 116 together with the motor 3 and the discharge pipe 511 (gas discharge path) etc., arrangement of the casing 1 and the treatment chamber 2 and connection to the gas supply device is optimized, the gas supply structure for the apparatus overall is simplified and manufacture is easy.

The casing 1 is formed as a truncated cone shape with a substantially trapezoidal cross section so that the external profile facing forwards becomes small, which means that an inclined side surface section of the casing 1 forms an inclined inner wall constituting the inflow path 215, and air supplied to the inside of the inflow path 215 from each of the supply ports 13, 13 . . . can be discharged towards the inclined inner wall, it becomes possible to direct flow towards a circumferential surface region direction of the dispersion plate 212, and it is possible to support uniform dispersive inflow to the inside of the treatment chamber 2.

The frame 7 is formed having upright side sections 722, 723 at the left and right and with a substantially U-shaped cross section overall in front view, and the treatment chamber 2 (casing 1) is fitted into a U-shaped section of a space formed between the upright side sections 722 and 723 at the left and right, via support shafts 116a, 116b that are orthogonal to a rotational axis. The upright side sections 722, 723 constitute support sections (support frames) for axially supporting the support shafts 116a, 116b to secure a structure for supporting the treatment chamber 2 capable of rotating up and down, it is possible to vary the attitude of the treatment chamber 2 to be facing upwards, facing sideways or facing downwards, it becomes possible to carry out treatment utilizing a process to vary the attitude of the treatment chamber 2, meaning varying inclination in a range of 0–90° conforming to respective operations such as introduction, processing and extraction of powder material, and it is possible to use either a vertical type or a horizontal type apparatus.

One of the support shafts 116b is formed in a cylindrical shape, and the inside of this cylindrical support shaft 116b constitutes arrangement paths (arrangement piping) for a gas supply pipe linking the treatment chamber 2 and the frame 7 and wiring etc., which means that these supply pipes and wiring are not exposed to the outside, it is possible to completely remove any danger of damage such as inadvertent attachment of processing material to induce a reaction, and it is possible to plan to link to devices mounted inside the bottom section 721 of the frame 7 and inside the upright side sections 722, 723.

Inner and outer covers 216 and 12 capable of being opened and closed are provided at a front surface side of the treatment chamber 2 and a front surface side of the casing 1, and because the inner cover 216 is constructed so as to be attached or removed by tightening or loosening bolts, while the outer cover 12 is hinged at an upper section (or it can be hinged at a lower section) and is constructed so as to slide stowed to the rear in an open state, it is possible to form respectively independent sections as a structure for closing the treatment chamber 2 inside the casing 1, and as a result opening and closing and also sealing of the treatment chamber 2 can be made easy, and the opened outer cover 12 does not obstruct introduction or removal of powder particles, or varying of attitude upwards or downwards accompanying the introduction or removal of powder particles.

The inner cover 216 and the outer cover 12 are formed from transparent resin, which means that it is possible to control behavior of the powder particles while confirming the fluidization and processing states of the powder particles through observation.

FIELD OF INDUSTRIAL UTILIZATION

The present invention is a rotating fluidized bed apparatus for powder particle, the apparatus causing gas to flow in to a cylindrical treatment chamber 2 in which powder particles are introduced, via a porous circumferential faceplate 212, and discharging gas that has flowed in to the treatment chamber 2 to the outside of the treatment chamber via a bag filter 5, wherein a gas circulation path 215 is formed at the periphery of the treatment chamber 2 via the circumferential faceplate 212, and the circumferential faceplate 212 has a structure enabling rotation around an axis. With this arrangement, it is possible to form a fluidized bed for controlling behavior of powder particles by having gas flow in from the outer side of the treatment chamber via the circumferential plate 212 to exert centripetal force on the powder particle, while exerting centrifugal force on the powder particles accompanying rotation of the circumferential plate 212. It is therefore possible to carry out various treatments such as mixing, granulation, coating, drying or reaction even with powder particles that are in the micron or submicron range.

In the present invention, by making the arrangement proportion of the bag filter 5 inside the treatment chamber 2 wider than the surface width of the dispersion plate 212 or larger than the surface area of the dispersion plate 212, it is possible to cause gas that has flowed into the treatment chamber 2 to be discharged at a lower rate at an axial region inside the treatment chamber 2 where centrifugal force is weak and discharge rate is fast. Accordingly, it is possible to efficiently discharge gas that has been introduced into the treatment chamber while balancing centripetal force and centrifugal force on the powder particles regardless of the particle size, and it is possible to carry out optimal operation control of introduction and discharge of gas for fluidized bed behavior. It is also possible to plan for improved product collection rate by reducing the amount of powder particles sticking to a bag filter accompanying gas flow, and reducing the amount of discharge through the bag filter.

With the present invention, the gas introduction means comprises a gas introduction path 215 formed between a casing 1 and ventilation means 212, and a plurality of supply ports 13 provided at specified intervals on an inner wall forming the gas inflow path 215. In this way, it is possible to cause gas to flow in uniformly from the entire surface region of the ventilation means 212 to the inside of the treatment chamber 2, without gas supplied to the gas inflow means being circulated excessively. Also, because the supply ports 13 can be made small, it is possible to manufacture a gas supply structure without the gas supply path projecting to the exterior surface of the casing 1. As a result, arrangement of the gas inflow means, and casing 1 and treatment chamber 2, and connection of the gas inflow means and the gas supply device can be optimized, the gas supply structure for the overall apparatus is simplified and manufacture is made easy.

What is claimed is:

1. A rotating fluidized bed apparatus for powder particles, said apparatus causing gas to flow into a cylindrical treatment chamber, in which the powder particles are placed, via a circumferential faceplate having permeability, and discharging gas that has flowed into the treatment chamber from the treatment chamber via a bag filter, wherein a gas circulation path is formed at the periphery of the treatment chamber via the circumferential faceplate, and wherein the bag filter is provided at a central portion inside the treatment chamber, and the circumferential faceplate is adapted to rotate circumferentially about the bag filter.

2. The rotating fluidized bed apparatus of claim 1, wherein a granulation nozzle is provided inside the bag filter.

3. The rotating fluidized bed apparatus of claim 1, wherein the bag filter is rotatable about its circumference, and is operably rotated by operation means.

4. The rotating fluidized bed apparatus of claim 1, wherein the bag filter is rotatable about its circumference, and is rotated by a drive unit.

5. The rotating fluidized bed apparatus of claim 4, wherein the rotational speed of the bag filter and the rotational speed of the circumferential plate are different.

6. The rotating fluidized bed apparatus of claim 1, wherein a drive unit for rotating the circumferential plate and a gas discharge path communicating with the bag filter are provided on one side of the treatment chamber, and a cover for opening and closing the treatment chamber is provided on the other side of the treatment chamber.

7. The rotating fluidized bed apparatus of claim 6, wherein at least part of the cover is made of a transparent material or semitransparent material.

8. The rotating fluidized bed apparatus of claim 1, wherein a casing body having the treatment chamber is arranged so that a rotational axis of the circumferential plate is horizontally oriented, and the casing is rotatable about a support shaft that is horizontally oriented and orthogonal to the rotational axis as a fulcrum.

9. The rotating fluidized bed apparatus of claim 8, wherein the casing body is operably rotated via a reduction gear mechanism comprising a worm gear.

10. The rotating fluidized bed apparatus of claim 1, wherein the circumferential plate is made of a porous plate, slits, metal mesh, multi-layer metal mesh or metal fibers.

11. The rotating fluidized bed apparatus of claim 1, wherein the bag filter is formed cylindrically of a retainer and bag cloth for covering the retainer.

12. The rotating fluidized bed apparatus of claim 1, said apparatus is used in a powder partide mixing process, a powder particle granulation process, a powder particle coating process, a powder particle dying process, or a powder particle reaction process.

13. A rotating fluidized bed apparatus for powder particle comprising, inside a casing,
a rotatable treatment chamber being provided with cylindrical gas ventilation means having permeability circumferentially about its axis,
gas introduction means provided at the periphery of the treatment chamber for causing gas to flow into the treatment chamber via the gas ventilation means, and
a bag filter, provided inside the treatment chamber, for discharging gas that has been introduced into the treatment chamber to the outside,
wherein the bag filter has an arrangement proportion inside the treatment chamber such that said proportion inside the treatment chamber is wider than a surface width of the gas ventilation means, or larger than the surface area of the gas ventilation means.

14. The rotating fluidized bed apparatus of claim 13, wherein the treatment chamber comprises an upright section upstanding in an axial direction from the gas ventilation means and having an arbitrary width, and an inclined section extending from the upright section.

15. The rotating fluidized bed apparatus of claim 14, wherein the inclined section is formed facing to the rear of the casing.

16. A rotating fluidized bed apparatus for powder particle comprising, inside a casing,
a rotatable treatment chamber being provided with cylindrical gas ventilation means having permeability circumferentially about its axis,
gas introduction means provided at the periphery of the treatment chamber for causing gas to flow into the treatment chamber via the gas ventilation means, and
a bag filter, provided inside the treatment chamber, for discharging gas that has been introduced into the treatment chamber to the outside, wherein the gas introduction means is comprised of a gas introduction passage formed between the casing and the ventilation means, and a plurality of supply ports provided at intervals on an inner wall forming the gas introduction passage.

17. The rotating fluidized bed apparatus of claim 16, wherein a gas supply chamber for distributing gas from the gas supply device to each of the supply ports is formed at a rear surface side of the supply ports, and the supply ports communicate with the gas supply chamber.

18. The rotating fluidized bed apparatus of claim 17, wherein the gas supply chamber is provided adjacent a rear surface side of the gas inflow passage at the portion of the supply ports.

19. The rotating fluidized bed apparatus of claim 16, wherein the supply ports are provided concentrically in one or two circles, or radially.

20. The rotating fluidized bed apparatus of claim 16, wherein the gas supply chamber is annular.

21. The rotating fluidized bed apparatus of claim 13, wherein the apparatus includes a frame for mounting a gas supply device, a collection bag filter and an operational control unit etc., the frame has an overall U-shape in front view, and the treatment chamber is mounted inside the U-shaped section via support shafts.

22. The rotating fluidized bed apparatus of claim 21, wherein one of the support shafts is made cylindrical, and the inside of the cylindrical support shaft constitutes a gas supply pipe linking the treatment chamber and the frame, and an arrangement path for wiring etc.

23. The rotating fluidized bed apparatus of claim 13, wherein an inner cover and an outer cover capable of being opened and closed are respectively provided at a front surface side of the treatment chamber and a front surface side of the casing, the inner cover for the treatment chamber being detachably attached to the treatment chamber, the outer cover for the casing being hinged at an upper section or lower section and constructed so as to be slide-stowed to the rear in an open state.

24. The rotating fluidized bed apparatus of claim 13, wherein the casing is formed in a truncated cone shape inclined forwardly.

25. The rotating fluidized bed apparatus of claim 16, wherein the apparatus includes a frame for mounting a gas supply device, a collection bag filter and an operational control unit etc., the frame has an overall U-shape in front view, and the treatment chamber is mounted inside the U-shaped section via support shafts.

26. The rotating fluidized bed apparatus of claim 25, wherein one of the support shafts is made cylindrical, and the inside of the cylindrical support shaft constitutes a gas supply pipe linking the treatment chamber and the frame, and an arrangement path for wiring etc.

27. The rotating fluidized bed apparatus of claim 16, wherein an inner cover and an outer cover capable of being opened and closed are respectively provided at a front surface side of the treatment chamber and a front surface side of the casing, the inner cover for the treatment chamber being detachably attached to the treatment chamber, the outer cover for the casing being hinged at an upper section or lower section and constructed so as to be slide-stowed to the rear in an open state.

28. The rotating fluidized bed apparatus of claim 16, wherein the casing is formed in a truncated cone shape inclined forwardly.

* * * * *